US007130823B1

(12) United States Patent
Rayner et al.

(10) Patent No.: US 7,130,823 B1
(45) Date of Patent: Oct. 31, 2006

(54) COMPUTER SYSTEM FOR DATA MANAGEMENT AND METHOD FOR OPERATION OF THE SYSTEM

(75) Inventors: Peter E. Rayner, Westfield, NJ (US); Elizabeth Brooks, Falmouth (GB); Fred Irwin, Frankfurt (DE); Mark Johnson, Near Wigan (GB); Andreas T. Lieven, Kelkheim (DE); Neil Potter, Westfield, NJ (US); Andreas Raschdorf, New Anspach (DE); Marie Torremante, Wiesbaden (DE); Christine Licci, Hanau (DE); Dieter Pfundt, Hofheim (DE)

(73) Assignee: Citibank Aktiengesellschaft, Frankfurt (DE)

( * ) Notice: Subject to any disclaimer, the term of this patent is extended or adjusted under 35 U.S.C. 154(b) by 0 days.

(21) Appl. No.: 09/454,978

(22) Filed: Dec. 3, 1999

Related U.S. Application Data

(63) Continuation-in-part of application No. 08/836,713, filed on May 13, 1997.

(60) Provisional application No. 60/111,030, filed on Dec. 4, 1998, provisional application No. 60/111,031, filed on Dec. 4, 1998, provisional application No. 60/111,032, filed on Dec. 4, 1998.

(30) Foreign Application Priority Data

Sep. 14, 1995 (EP) .................................. 95114467
Sep. 10, 1996 (WO) ....................... PCT/EP96/03972

(51) Int. Cl.
*G06F 17/60* (2006.01)
(52) U.S. Cl. .......................................... 705/37; 705/35
(58) Field of Classification Search ................ 705/10, 705/35; 395/237; 364/408
See application file for complete search history.

(56) References Cited

U.S. PATENT DOCUMENTS

| 4,363,489 A | 12/1982 | Chodak et al. ............. 273/237 |
| 4,412,287 A | 10/1983 | Braddock, III ............... 705/37 |

(Continued)

FOREIGN PATENT DOCUMENTS

EP        0388162 A2    3/1990

(Continued)

OTHER PUBLICATIONS

Super SOES + Selected Reference, 1997.*

(Continued)

*Primary Examiner*—Alain L. Bashore
(74) *Attorney, Agent, or Firm*—George T. Marcou; Kilpatrick Stockton LLP

(57) ABSTRACT

An automated trading system makes use of various components, such as one or more transaction servers and one or more rate servers and a number of terminals. A request for a proposed transaction for a user is entered at either a user's terminal or a sales trader's terminal and sent to a transaction server coupled to a rate server. If a first predefined condition for generating an executable rate quote is identified, an executable rate quote is generated by the rate server and sent back to the user's or sales trader's terminal for the user. Otherwise, if a second predefined condition for a category trader's rate quote is identified, a request for the category trader's rate quote is sent by the transaction server to one or more category trader's terminals, prompting entry of a category trader's rate quote by one or more of the category traders, which is likewise sent back to the user's or sales trader's terminal for the user. If a request for execution is entered at the user's or sales trader's terminal within a predetermined period of time, the transaction server hands off the request for execution to a hand-off server, which executes the transaction for the user.

40 Claims, 18 Drawing Sheets

U.S. PATENT DOCUMENTS

| | | | |
|---|---|---|---|
| 4,674,044 A | 6/1987 | Kalmus et al. | 705/37 |
| 4,677,552 A | 6/1987 | Sibley, Jr. | 705/37 |
| 4,774,662 A | 9/1988 | Ito et al. | 705/42 |
| 4,789,928 A | 12/1988 | Fujisaki | 705/37 |
| 4,823,265 A | 4/1989 | Nelson | 705/35 |
| 4,825,050 A | 4/1989 | Griffith et al. | 235/379 |
| 4,903,201 A | 2/1990 | Wagner | 705/37 |
| 4,942,616 A | 7/1990 | Linstroth et al. | 704/275 |
| 4,975,865 A | 12/1990 | Carrette et al. | 700/10 |
| 5,077,665 A | 12/1991 | Silverman et al. | 705/37 |
| 5,095,429 A | 3/1992 | Harris et al. | 705/35 |
| 5,101,353 A | 3/1992 | Lupien et al. | 705/37 |
| 5,113,499 A | 5/1992 | Ankney et al. | 340/5.74 |
| 5,126,936 A | 6/1992 | Champion et al. | 705/36 |
| 5,136,501 A | 8/1992 | Silverman et al. | 705/39 |
| 5,175,797 A | 12/1992 | Funabashi et al. | 706/16 |
| 5,258,908 A | 11/1993 | Hartheimer et al. | 705/37 |
| 5,270,922 A | 12/1993 | Higgins | 705/37 |
| 5,297,031 A * | 3/1994 | Gutterman | 364/408 |
| 5,297,032 A | 3/1994 | Trojan et al. | 705/37 |
| 5,305,200 A | 4/1994 | Hartheimer et al. | 705/37 |
| 5,339,392 A | 8/1994 | Risberg et al. | 345/762 |
| 5,350,200 A | 9/1994 | Hartheimer et al. | 285/92 |
| 5,375,055 A | 12/1994 | Togher et al. | 705/37 |
| 5,500,793 A | 3/1996 | Deming, Jr. et al. | 705/37 |
| 5,508,913 A | 4/1996 | Yamamoto et al. | 705/37 |
| 5,557,517 A | 9/1996 | Daughterty, III | 705/37 |
| 5,692,233 A | 11/1997 | Garman | 705/36 |
| 5,710,889 A | 1/1998 | Clark et al. | 235/379 |
| 5,717,989 A | 2/1998 | Tozzoli et al. | 705/37 |
| 5,727,165 A * | 3/1998 | Ordish | 395/237 |
| 5,749,077 A | 5/1998 | Campbell | 705/36 |
| 5,761,661 A | 6/1998 | Coussens et al. | 707/9 |
| 5,765,141 A | 6/1998 | Spector | 705/14 |
| 5,778,224 A | 7/1998 | Tobe et al. | 709/100 |
| 5,787,402 A | 7/1998 | Potter et al. | 705/37 |
| 5,788,224 A | 8/1998 | Platt | 256/66 |
| 5,794,219 A | 8/1998 | Brown | 705/37 |
| 5,797,127 A | 8/1998 | Walker et al. | 705/5 |
| 5,809,483 A | 9/1998 | Broka et al. | 705/37 |
| 5,832,505 A | 11/1998 | Kasso et al. | 707/104 |
| 5,842,178 A | 11/1998 | Giovannoli | 705/26 |
| 5,864,827 A | 1/1999 | Wilson | 705/35 |
| 5,873,071 A | 2/1999 | Ferstenberg et al. | 705/37 |
| 5,890,138 A | 3/1999 | Godin et al. | 705/26 |
| 5,893,079 A | 4/1999 | Cwenar | 705/36 |
| 5,915,209 A | 6/1999 | Lawrence | 340/3.7 |
| 5,970,479 A | 10/1999 | Shepherd | 705/37 |
| 5,987,432 A | 11/1999 | Zusman et al. | 705/35 |
| 6,058,378 A | 5/2000 | Clark et al. | 705/37 |
| 6,282,521 B1 * | 8/2001 | Howorka | 705/37 |

FOREIGN PATENT DOCUMENTS

| | | |
|---|---|---|
| EP | 0401203 A2 | 5/1990 |
| EP | 0434224 A2 | 11/1990 |
| EP | 0512702 A2 | 5/1991 |
| EP | 0471063 B1 | 2/1992 |
| EP | 0513484 A2 | 2/1992 |
| EP | 0 762 304 A1 | 3/1997 |
| GB | 2161003 A | 6/1985 |
| GB | 2165421 A | 4/1986 |
| GB | 2258061 A | 1/1993 |
| GB | 2277389 B | 3/1994 |
| WO | WO 91/14231 | 3/1990 |
| WO | WO 95/06918 | 3/1995 |
| WO | WO 95/26005 | 9/1995 |
| WO | WO 98/53417 | 11/1998 |

OTHER PUBLICATIONS

Gale Group: "INSTINET's purchase of BOMAR yields technical analytics"; Aug. 7, 1992.*

Anonymous, Cash Management News, No. 74, pp. 1-2, Nov. 1991.

Anonymous, Automation of foreign exchange activity in Supplement to Corporate Finance, pp. 20-23, Sep. 1992.

Orfali, Robert and Harkey, Dan, "Client server survival guide with OS/2," 1994 by Nostrand Reinhold, pp. 386-391.

Chon, S., Jo, J., and Park, Y., Time-out situation signaling method for real-time OS—involves calling *interrupt* service routine and processing *timeout* request, KR 9407830 B, Abstract, 1 page, Jun. 18, 1996.

Anonymous, Financial Information Exchange Protocol, Version 2.7(a), pp. i-iv, 1-9, 40-41, Jan. 17, 1995.

Interactive Brokers LLC, "Real time global electronic trade execution," Interactive Broker Brochure, Oct. 16, 1997.

Opposition by Deutsche Bank AG (German and translated versions) with attachments (German and translated versions), dated Dec. 19, 1997, having EPO file No. 0384-49.676EP-kö.

Opposition by Bayerische Vereinsbank AG (German and translated versions) with attachments (German and translated versions), dated Dec. 19, 1997, having EPO file No. 0384-49.676EP-kö.

DTB Deutsche Terminborse GmbH (a) Rundschreiben No. 66/91 dated Aug. 6, 1991 (German), (b) Letter of Mark Thornburgh dated Dec. 16, 1997 (English).

Confirmation of the QT Optec company dated Dec. 12, 1997 (German) with Encl. 1 to 3 (German/English).

Extract from the stock exchange regulations of the German Futures Exchange DTB of Mar. 1995 (German).

Anwenderhandbuch "Optionsscheingeschaft," dated Dec. 2, 1997, pp. 1-22 (German).

DIOS Kurzbeschreibung, SGZ-Bank, Sep. 26, 1994 (German).

DIOS Prospekt, SGZ-Bank, Apr. 1995 (German).

Ablauf von DIOS Bildschirmmasken (German).

Begriff der Reaktionszeit im DIOS, dated May 25, 1994.

DIOS Schulungsunterlagen, SGZ-Bank, dated Oct. 10/11, 1994.

Rundschreiben of the SGZ-Bank to the Volks- and Raiffeisenbanken / 4 letters, dated Aug. 15, 1995, Apr. 13, 1995, Jul. 4, 1994, Aug. 10, 1995 (German).

Information / Matarbeiterzeitung der SGZ-Bank / Sep. 1994, pp. 1-2 (German).

Rundschreiben of the SGZ-Bank to the Volks- and Raiffeisenbanken / 2 letters, dated Oct. 11, 1994 and Nov. 11, 1994 (German).

Notice from Mrs. Christa Franke, dated Jan. 31, 1995, to Herrn Dr. Franke and Herrn Seip (German).

Declaration "Christa Franke" of Dec. 18, 1997, together with Notice to Herrn Dr. Franke and Herrn Seip of Feb. 3, 1995 (German).

Message from Reuter of Jan. 1995 concerning CATS-OS (German).

Extract from "Wirtschaftswoche," No. 5 / Jan. 28, 1995, p. 88 (German).

"Computerwissen," Verlag Markt + Technik 1992, Haar/Munchen, p. 236/237 (German with English Translation).

Lecture by Dipl.-Math. Steffen Rabmann, "Sicherheit in der Kommunikationstechnik . . . ," Sep. 1993 (German).

Prospekt DIOS / Stand 2 / 1996 (German).

Prospekt DIOS / Stand 4 / 1995 (German).

DIOS Pflegedialoge—Schulung—Oct. 4, 1994 (German).

Letter Fiducia of Apr. 10, 1995 (German).

Extract Prospekt FIDUCIA, Jun. 27-29, 1995 (German).

Kurzbeschreibung, "Erste Schritte" of the DIOS System, dated May 10, 1995.

"Bildschirmmasken" des DIOS Systems, dated Dec. 8, 1997.

Udo Bretschneider: PC für Einsteiger Data Becker, Düsseldorf, 1994: pp. 512-513 (English Translation).

DIOS: Documentation of a test of the request mode and of the refesh function of May 24, 1995.

DIOS: Printout from a display screen, dated Jun. 19, 1995, showing the request mode.

DIOS: Release planning of the DIOS system of Nov. 15, 1996.

Letter from SGZ-Bank to Volksbank eG, a participant in the pilot phase, dated Jul. 21, 1994.

Response to comment on the Oppositions by Siemens Nixdorf Informationssysteme AG.

Response to comment on the Oppositions by Bayerische Vereinbank AG.

Response to comment on the Oppositions by Commerzbank AG.

Response to comment on the Oppositions by Deutsche Bank AG.

Response to comment on the Oppositions by Deutsche Börse AG.

Response to comment on the Oppositions by Schwizerischer Bankverein AG.

Response to comment on the Oppositions by SGZ- Bank AG.

Author unknown, English Translation—*DIOS—Short Description (at the start of the pilot phase)*; SGZ Bank, Sep. 26, 1994.

Author unknown, English Translation—*DIOS—III.2.5 Reaction time*, version 11, page 47, May 25, 1994.

Author unknown, English Translation—*DIOS* (brief overview); SGZ Bank, Apr. 1995.

Brand, Rupp, Wiedl, English Translation—*Performance catalog for MB foreign exchange*, SGZ Bank, version 12, pp. 6, 22, 79, 92, 99-100, 102, May 31, 1994.

International Search Report for International Application No. PCT/EP96/03972, dated Dec. 10, 1996 (mailing date).

European Search Report for Application No. 99123955.9-2201, dated Jan. 5, 2001.

Internet Site https://wpl.itn.net/cgi/store (Reference Not Included).

* cited by examiner

| | | | |
|---|---|---|---|
| 32 – Instrument: | STG/DM Warrant | | |
| SE No.: | 807 123 | CALL | EU | TXNid |
| 34 – Volume: | | Av. Vol.: | N/A | |
| 42 – Price: | 1.7474 | Units: | 1/100 | |
| Expiry Date: | 16.01.1994 | | | |
| Strike Price: | 1.5673 | DM | | |
| Buy | Re-request — 40 | Cancel — 38 | | |
| 36 | | | | |

| RFQ Messages | | | | |
|---|---|---|---|---|
| Time | Se no. | Srt Name | Txn id | Text |
| Count: | | | | |

Request For Quote

Trade Details
- Trade Ref No:
- Currency:
- Volume:
- Buy/Sell:
- Value Date:
- Entered By:

Instrument Details
- Instrument:
- Group:
- AM/EU:
- Description:
- Call/Put:
- Expiry Date:
- Strike Date:
- Cap Price:

Suspended
- ☐ Rate
- ☒ Instrument
- ☐ Counterparty
- ☐ System

Deal Amount
- ☐ exceeds max.
- ☐ exceeds avail.

RFQ
- Indicative Price: 1.7474
- Dealer's Price:

Accept — 48

Reject — 50

Close

Branches

Branch ID: ☐

Branch Name: ☐ — 154

Branch Address
  Street: ☐
  City: ☐
  Post Code: ☐

Contact: ☐

Institution ID: ☐ ▶

System Name: ☐

KSVN ○
Depot ●

Language: ☐ ▶

Base Ccy: ☐ ▶

Price Timeout: 0

S. Trader Price Timeout: 0

S.E. Closes: ☐ ##.##

Suspended
  No ○    Yes ○

Rate Server: ☐

Handoff Server: ☐

[Find] — 156    [Insert]    [Update]    [Delete]    [Clear]    [Close]

Request For Quote

Trade Details
- Trade Ref No:
- Currency:
- Volume:
- Buy/Sell:
- Value Date:
- Entered By: – 168

Suspended
- ☐ Rate
- ☐ Instrument
- ☐ Counter Party
- ☐ System

Deal Amount
- ☐ Exceeds Max.
- ☐ Exceeds S. Avail.
- ☐ Exceeds B. Avail.

Instrument Details
- Instrument:
- Group:
- AM/EU:
- Description:
- Call/Put:
- Expiry Date:
- Strike Price:
- Cap Price:

RFQ

Indicative B. Price: [     ]    Indicative S. Price: [     ]

Dealer's B. Price: ◄► 0.00    Dealer's S. Price: ◄► 0.00

[Accept]    [Reject]    [Close]

COMPUTER SYSTEM FOR DATA MANAGEMENT AND METHOD FOR OPERATION OF THE SYSTEM

CROSS REFERENCE TO RELATED APPLICATIONS

This application is a continuation-in-part of U.S. Ser. No. 08/836,713, filed May 13, 1997, which claims priority to applicants' PCT application no. PCT/EP96/03972, filed Sep. 10, 1996, and which claims priority to applicants' EPO application no. 95114467.4, filed Sep. 14, 1995. This application claims priority to applicants' applications Ser. No. 60/111,030 filed Dec. 4, 1998; Ser. No. 60/111,031 filed Dec. 4, 1998; and Ser. No. 60/111,032 filed Dec. 4, 1998, now abandoned.

FIELD OF THE INVENTION

The present invention relates to a computer system for data management and method for operation of the system, and more particularly to an automated warrant trading system.

BACKGROUND OF THE INVENTION

In the past, the trading of warrants was time consuming and cost intensive, because it was necessary for a customer in a financial institution, such as a bank, to search by telephone or in publications to locate the best warrant for a consumer. If the consumer wished to purchase warrants, it was necessary for the consumer to first contact his or her local bank which could process the order through a stock exchange or by placing a call to a warrant market maker. Since an on-line information and trading system about traded warrants with executable prices did not exist, the customer in the local bank was not able to provide the consumer with actual on-line information. Hence, there existed a time differential between the placing of a buy/sell order by the customer and its implementation, resulting in a risk of exchange and/or price fluctuations during that time difference.

It was often the case that the implementation of the buy/sell order was based on a limit oriented on the rates of the previous day, since the order could not be implemented on the same day. The reasons for the time delay were either that the order was placed a number of hours before it was executed at the stock exchange or that the trading room telephones of the market maker were often busy during hectic market times. Therefore, local banks often placed blind orders at unknown prices for consumers and did not receive immediate deal confirmations.

The invention disclosed in co-pending U.S. patent application Ser. No. 08/836,713 (referred to herein as "the CATS-OS system" or "the existing CATS-OS system" and incorporated herein by this reference) addresses those problems and provides a computer system for data management and a method for operating the system for the bank, which realizes a data management providing instantaneous data with an improved accuracy and a reduced error probability when processing data transactions, combined with a high level of security. The existing CATS-OS system includes use of a client-server architecture, which has a number of servers, such as a transaction server, a rate server, a hand-off server, a credit server, and a security server. In a typical interaction with the CATS-OS system, the customer or other user of the system connects to the system and is authenticated by a security manager, which allows the user certain privileges depending on the level of user, such as customer, trader, and administrator levels.

In the existing CATS-OS system, a customer normally is allowed to view rates, execute transactions, view those transactions, print reports against transactions conducted, and view positions. A trader is allowed to manually input rates if desired, although this not a normal trader function. Normal trader functions include maintaining instruments as new instruments become available and old instruments expire, generally maintaining the system, maintaining volumes, maintaining the credits, and maintaining the users themselves. The main rate and sales information is input automatically from customer systems. Customers typically have various systems that calculate the prices of warrants. The CATS-OS system essentially receives all of the rates information that comes from customer systems, which may be three or four million updates a day, inputs this information into a separate rate server and then holds this information so that it is available for the customers to deal against.

Currently, the CATS-OS system, which primarily deals with warrants and equities, functions on a standing price basis, in which the host bank for the system issues a price that the bank guarantees for a certain number of seconds. This guarantee allows the users of the CATS-OS system to deal at the price issued. However, in order to limit the risk to the host bank, the host bank typically only authorizes deals up to a certain size at the standing price. Thus, a problem with the existing CATS-OS system is that users may need to perform deals that exceed the host bank's allowable deal size.

In addition, the existing CATS-OS system requires a certain amount of technology and equipment to be available at the customer's or other user's site. This technology and equipment can include a personal computer (PC) and the capability to communicate data. Not all customers or other potential users of the CATS-OS system wish to have these capabilities installed, and instead prefer to deal with warrant trading on the telephone by directly speaking to a trader. This preference directly conflicts with the purpose of the CATS-OS system, which is intended to avoid the situation of customers directly speaking to traders for what are typically smaller sized trades.

Further, while the existing CATS-OS system provides an effective automated electronic trading tool for bank customers and consumers for a single bank, the system displays the process of only one bank. The customers are primarily brokers, so the bank is often unaware of the identity of the actual consumer. Currently, it is not possible, for example, for a plurality of banks to add prices to the CATS-OS system in order to allow brokers to buy and sell warrants of other banks for consumers while dealing with only a single system.

SUMMARY OF THE INVENTION

It is a feature and advantage of the present invention to provide an automated trading system and method which allows deals to be consummated that exceed limits imposed, for example, by the host bank, as well as in other circumstances in which a rate may not be available.

It is a further feature and advantage of the present invention to provide an automated trading system and method which allows a trader to respond to a request for a quote and to provide a proposed price against which a user can trade.

It is another feature and advantage of the present invention to provide an automated trading system and method which allows a special type of trader, referred to as a sales trader, to deal on behalf of selected customers within the trading system, without necessarily knowing the price of particular warrants and without setting their own prices.

It is an additional feature and advantage of the present invention to provide an automated trading system and method which affords all the advantages of the system, such as reduced error rates, without the expense associated with actually installing the system.

It is another feature and advantage of the present invention to provide an automated trading system and method which enables selected customers to deal over the telephone and avoids the necessity for such customers to install the system.

It is a further feature and advantage of the present invention to provide an automated trading system and method which enables full warrant trading capabilities without the expense of highly paid professional traders.

It is an additional feature and advantage of the present invention to provide an automated trading system and method which enables users to easily buy and sell warrants from a plurality of banks and market makers.

It is a further feature and advantage of the present invention to provide an automated trading system and method that avoids the need for users of the system of one bank who access the system by dial-up having to disconnect and redial with another bank.

It is another feature and advantage of the present invention to provide an automated trading system and method which avoids the necessity for a user having to log in separately to a plurality of systems.

It is an additional feature and advantage of the present invention to provide an automated trading system and method that avoids integrating the system to the extent that the system may be considered and regulated as a stock exchange.

It is another feature and advantage of the present invention to provide an automated trading system and method that maintains segregation between price makers.

To achieve the stated and other features, advantages and objects, an embodiment of the present invention provides an automated system and method for warrant trading which includes various aspects, such as a request for quote aspect, a sales trader aspect, and a multi-bank aspect. The method and system for an embodiment of the present invention makes use, for example, of various servers, such as a transaction server, a rate server, a hand-off server, a credit server, and a security server.

The request for quote aspect for an embodiment of the present invention makes use in particular, for example, of a user terminal, category trader terminals, the transaction server, the rate server, and a mail server. The sales trader aspect for an embodiment of the present invention makes use in particular, for example, of one or more sales trader terminals, the transaction server, the credit server, the hand-off server, and the credit server. The multi-bank aspect for an embodiment of the present invention makes use in particular, for example, of the user terminal, as well as the transaction servers, rate servers, and hand-off servers of a plurality of independently maintained and segregated trading systems.

In an embodiment of the present invention, a request for the user for a proposed financial transaction, such as a warrants trade, is received at a terminal, such as the user terminal or the sales trader terminal. The request can be received at the user terminal by the user directly inputting the request at the user terminal. Alternatively, the request is communicated, for example, by telephone, fax or e-mail by the user to a sales trader and is received at the sales trader terminal by the sales trader inputting the request for the user at the sales trader terminal.

In turn, in an embodiment of the present invention, the request is received from the terminal by a transaction server coupled to the terminal and by a rate server coupled to the transaction server. In the multi-bank aspect, the request is received from the terminal by the transaction servers of each of the plurality of independently maintained and segregated trading systems coupled to the terminal and by the corresponding rate server coupled to the transaction servers of each of the trading systems.

In an embodiment of the present invention, a rate quote is generated by the system, which consists of either an executable rate quote or a category trader's rate quote for the proposed financial transaction. The executable rate quote is automatically generated by the rate server, if a first predefined condition for generating the executable rate quote is identified by the transaction server or the rate server coupled to the transaction server. In the multi-bank aspect, the executable rate quote is automatically generated by the rate server of at least one of the plurality of trading systems coupled to the corresponding transaction server of the particular trading system, if the first predefined condition for generating the executable rate quote is identified by either the rate server or the transaction server of the particular trading system.

In an embodiment of the present invention, the first predefined condition for automatically generating the executable rate quote exists if a predefined cause for rejection of the proposed transaction, such as the transaction counterparty is suspended, the proposed transaction system is suspended, the proposed transaction instrument is suspended, the proposed transaction rate is suspended, the proposed transaction exceeds the available volume, or the proposed transaction amount exceeds a predefined limit, is not identified by either the transaction server or the rate server.

In an embodiment of the present invention, if the first predefined condition for automatically generating the executable rate quote is not identified, then the category trader's rate quote is generated if a second predefined condition for generating the category trader's rate quote is identified. The second predefined condition for generating the category trader's rate quote exists if one or more of the predefined causes for rejection of the proposed financial transaction is identified by either or both of the transaction server or the rate server coupled to the transaction server and if a predetermined setting of a request for quote parameter corresponding to the one or more identified cause or causes for rejection is likewise confirmed by one or both of the transaction server or the rate server.

In an embodiment of the present invention, if the second predefined condition for generating a category trader's rate quote is identified, the transaction server automatically generates a request for a category trader's rate quote, which is automatically communicated by the transaction server via a mail server to one or more category trader's terminals. One or more of the category traders is prompted by a display on the category trader's terminal for entry of the category trader's rate quote, and at least one of the category traders can then enter the category trader's rate quote at the category trader's terminal, which is communicated by the trader's terminal to the transaction server.

In an embodiment of the present invention, the transaction server sends either the executable rate quote or the category trader's rate quote to the user's terminal, or in the sales trader aspect, to the sales trader terminal for the user, where the rate quote is automatically displayed for the user. At the same time, a system counter is automatically set for a predetermined period of time, which holds the generated rate quote for the user for the predetermined time period and, in effect, guarantees the rate quote for the predetermined time period for the user.

If a request for execution of the proposed transaction for the user is received at the user's terminal, or in the sales trader aspect, at the sales trader's terminal, within the predetermined period of time, the request for execution is automatically sent to the transaction server coupled to the terminal. In the multi-bank aspect, the request for execution is automatically sent to the transaction server of one of the plurality of trading systems. In either case, the request for execution is automatically handed off to a hand-off server coupled to the transaction server, and the hand-off server automatically executes the proposed transaction for the user.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 3 shows a sample deal entry screen for the request for quote aspect of an embodiment of the present invention;

FIG. 4 shows a sample message box for the request for quote aspect of an embodiment of the present invention;

FIG. 5 shows a sample trade details screen for the request for quote aspect of an embodiment of the present invention;

FIG. 13 shows a sample branch maintenance screen for the sales trader aspect of an embodiment of the present invention;

FIG. 15 shows a sample trade details screen for the sales trader aspect of an embodiment of the present invention;

DETAILED DESCRIPTION

Referring now in detail to an embodiment of the invention, an example of which is illustrated in the accompanying drawings, a request for quote aspect of an embodiment of the present invention provides an automated system and method for warrant trading which allows deals to be consummated that exceed the limits allowed by the host bank and in other circumstances in which a rate may not be available. To accomplish this function, an embodiment of the present invention allows a trader to respond to a request for a quote and to provide a proposed price against which the user can trade. The system and method of an embodiment of the present invention performs the request for quote function, which was not previously possible, in connection with the existing CATS-OS system.

Figure 1:
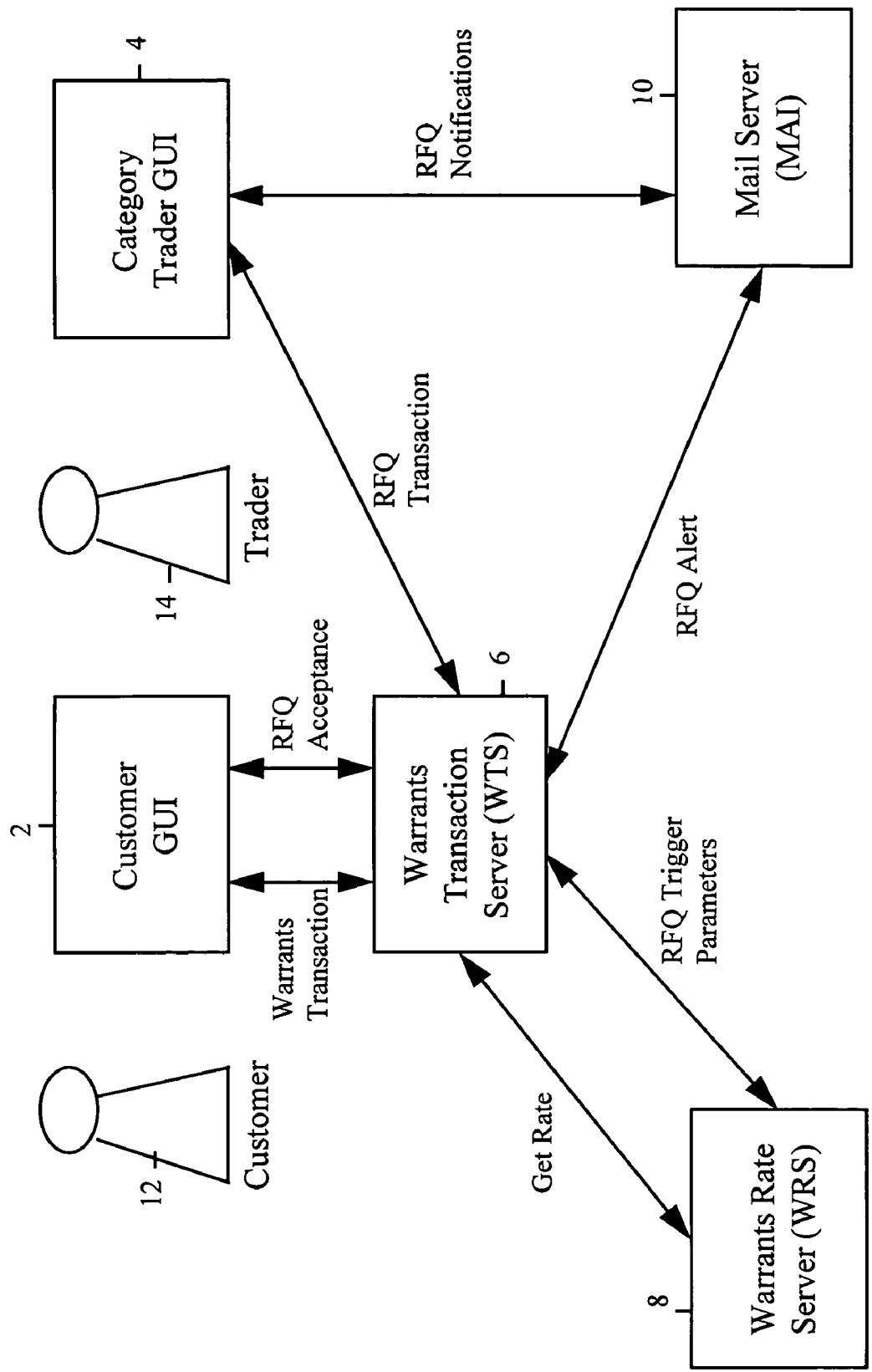
FIG. 1 is a schematic diagram which illustrates an example overview of key components and the flow of information between the key components of a request for quote aspect of an embodiment of the present invention.

FIG. 1 is a schematic diagram which illustrates an example overview of key components and the flow of information between key components of the request for quote aspect for and embodiment of the present invention. The request for quote aspect makes use, for example, of a graphical user interface (GUI), including a customer GUI 2 and a trader GUI 4. The request for quote aspect also utilizes a warrants transaction server (WTS) 6, a warrants rate server (WRS) 8, and a mail server (MAI) 10. The request for quote aspect is activated when a user, such as a customer 12 at the customer GUI 2, attempts to conduct a deal as normal within the CATS-OS system, but is prevented for some reason specific to the existing CATS-OS system, such as the maximum transaction size being exceeded. A message regarding the attempted deal is routed to a trader 14 at the trader GUI 4. The trader 14 views information about the deal, which allows the trader 14 to monitor the deal and to input a proposed price manually, based on criteria provided in the customer's attempt. The manually input information is then transmitted to the customer 12, who has the opportunity to accept or decline the proposed deal.

Thus, the request for quote aspect for an embodiment of the present invention includes essentially an electronically messaged conversation between the customer 12 at the customer GUI 2 and the trader 14 at the trader GUI 4, providing an extension of the existing CATS-OS system under certain circumstances, a principle one of which is that the attempted deal is larger than the host bank is willing to handle at the standing price. To accomplish this electronic messaging, an embodiment of the present invention provides additional messaging capability to existing CATS-OS system messages. In particular, an embodiment of the present invention includes a system and method for providing messages directly between the customer GUI 12 and the trader GUI 4. The trader 14 at the trader GUI 4 views a pop-up message when the customer 12 at the customer GUI 2 wishes to perform a rate that would not otherwise be allowed, and the trader 14 then responds accordingly, for example, by inputting a proposed price.

The request for quote aspect for an embodiment of the present invention improves the usability of the existing CATS-OS system by allowing the trader 14 to quote rates for all instruments for which the trader 14 is responsible. The trader 14 is kept permanently informed of the warrant transactions that are being rejected, and the trader 14 is given the power to override the rejected transactions. The request for quote mechanism is useful where the CATS-OS system is unable to quote an executable rate automatically. It is also useful for executing transactions that would otherwise be rejected due to certain request for quote triggers or parameters. For every warrant deal transaction that would otherwise be rejected, an embodiment of the present invention makes it possible for the trader 14 to override the request for quote triggers. The trader 14 also has the ability to quote a rate to the customer 12 for the above circumstances. These request for quote notifications go only to the traders who are responsible for the instruments specified in the warrants transactions.

Figure 2:
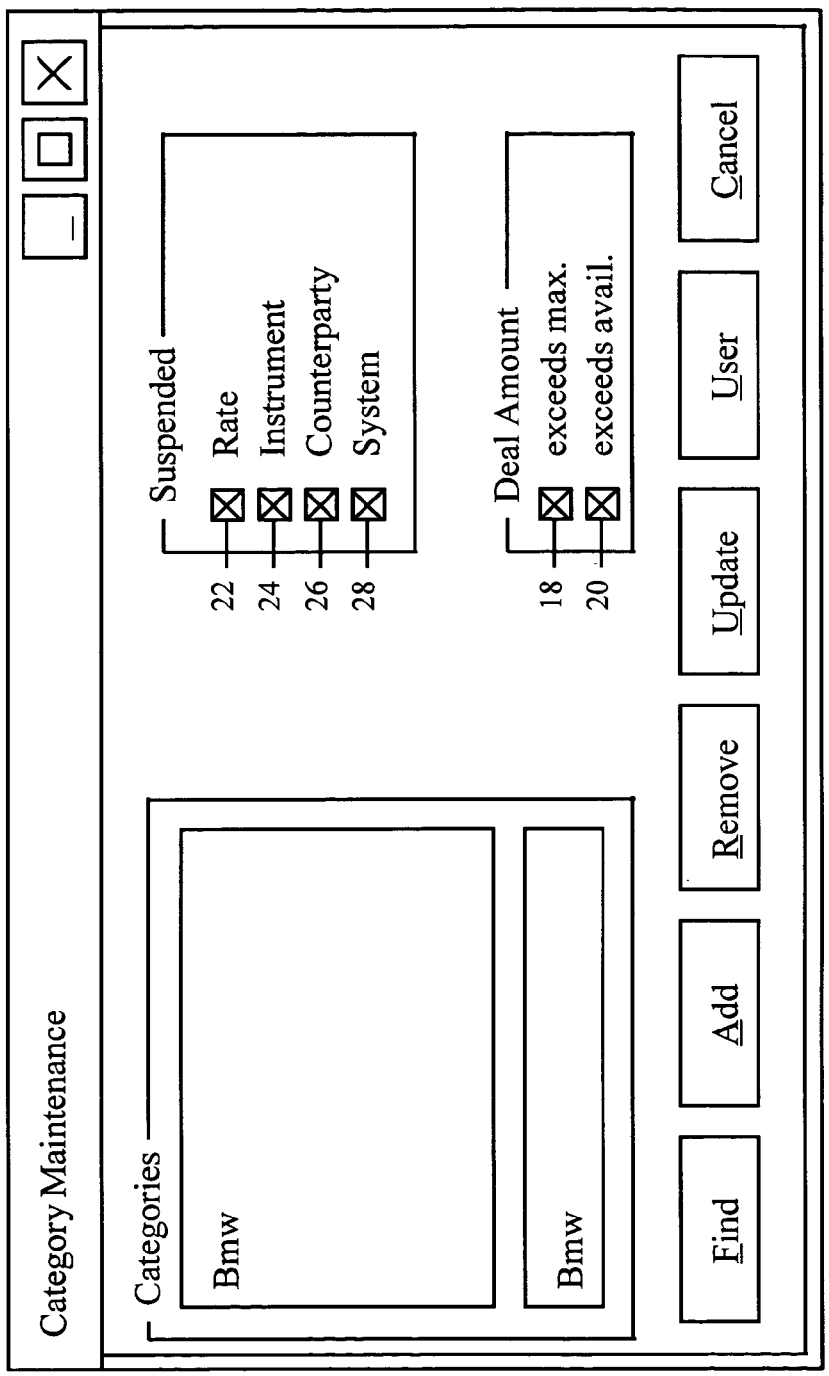
FIG. 2 is a sample category maintenance screen for the request for quote aspect of an embodiment of the present invention.

FIG. 2 is a sample category maintenance screen 16 for the request for quote aspect of an embodiment of the present invention. Every instrument belongs to a category. For every category, parameters are set up which indicate when a request for quote should be triggered. These categories include, for example, the deal amount exceeds a maximum allowed 18; the deal amount exceeds the available volume 20; the rate is suspended 22 due to sanity, spread, or time-out; the instrument is suspended 24; the counterparty is suspended 26; or the system is suspended 28. The default setting is all of the request for quote triggers switched on. For new categories added, the GUI displays the default settings. The trader 14 is able to switch off any or all of the request for quote triggers for a given category. Hence, for every warrants transaction, the WTS 6 only triggers the request for quote based on what the set-up is for that instrument category.

In an embodiment of the present invention, the default setting is such that if any or all of the request for quote trigger situations arise, then the WTS 6 triggers a request for quote to the category traders. All of the reasons resulting in the request for quote are shown. If all of the request for quote (RFQ) trigger parameters are switched off except one, such as the instrument is suspended 24, then any warrants transaction is rejected in all the trigger circumstances, except when the instrument is suspended. If none of the RFQ triggers are switched on, then any of the trigger circumstances result in the WTS 6 transaction being rejected. All traders and system administrators, with the privilege to maintain instruments, automatically have the access rights to maintain categories and RFQ trigger parameters.

FIG. 3 shows a sample deal entry screen 30 for the request for quote aspect of an embodiment of the present invention. The customer 12 enters the instrument identification 32 and volume 34 and indicates whether the customer 12 wishes to buy or sell the warrant. The GUI validates the details and transmits the price quote request to the WTS 6. For every transaction, the WTS 6 checks whether any RFQ parameters are switched on or not. For the instrument specified by the customer 12 in the warrants transaction, the WTS 6 gets the RFQ parameters from the WRS 8. The WTS 6 performs various checks, such as checking if the counterparty or system is suspended. If the relevant RFQ parameters, such as counterparty suspended 26 or system suspended 28 are set and the counterparty or system is suspended, then the WTS 6 acknowledges that a request for quote is required for the transaction. Otherwise, the transaction is rejected with the appropriate message displayed on the screen of the customer GUI 2. If all is well, the WTS 6 passes the rate request to the WRS 8.

In the request for quote aspect of an embodiment of the present invention, the WRS 8 performs various checks, such as instrument suspensions, rate suspensions due to sanity, spread or time-out. If any of these are true, and the relevant RFQ parameters, such as instrument suspended 24 or rate suspended 22, are set, then the WRS 8 is unable to quote a rate. The WRS 8 then acknowledges that a request for quote is needed and gives the reasons for it and passes these to the WTS 6. Otherwise, if the instrument or rate is suspended and the relevant RFQ parameters, such as instrument suspended 24 or rate suspended 22, are switched off, the transaction is rejected, and the GUI displays an appropriate message on the screen. In the existing CATS-OS system, the WRS 8 checks if the deal size exceeds available volume when the customer 12 executes a warrants transaction. However, in the request for quote aspect for an embodiment of the present invention, the WRS 8 does this check when the customer 12 requests a price quote. The WRS 8 checks if the deal amount exceeds the available volume. If the deal amount is greater than the available volume, and the relevant RFQ parameter, namely exceeds available volume 20, is set, then the WRS 8 acknowledges that a request for quote is needed, and this is sent to the WTS 6. Otherwise, if the WRS 8 is able to quote an executable rate automatically, the WRS 8 sends the quote to the WTS 6.

In the request for quote aspect of an embodiment of the present invention, the WTS 6 checks if the deal amount, determined by the buy or sell rate times the volume, exceeds the maximum transaction limit allowed. In the existing CATS-OS system, this check is done at deal execution time. In the request for quote aspect for an embodiment of the present invention, it is done when the customer 12 requests a price quote. If the amount exceeds the maximum limit, and the relevant request for quote parameter, namely exceeds maximum 18, is set, then the WTS 6 acknowledges that a request for quote is required. Otherwise, the transaction is rejected. If all is well, and the WRS 8 quotes an executable rate, the executable rate is passed to the customer GUI 2 for the customer 12 to see. If the customer 12 executes the deal within a certain time period by pressing the "Buy" button 36 on the deal entry screen 30, the deal is executed. Alternatively, the customer 12 can press the "Cancel" button 38 on the deal entry screen 30, in which case the transaction is deleted. If a time-out occurs, then the customer 12 is either able to re-request a rate, by pressing the "Re-request" button 40 on the deal entry screen 30, or cancel the deal. Re-requesting a deal results in the previous transaction being deleted and a new one being entered in the transactions database of the WTS 6. Otherwise, the transaction remains unexecuted.

In the request for quote aspect of an embodiment of the present invention, if a request for quote is necessary, the WTS 6 informs the customer GUI 2, including all the reasons for it. The customer GUI 2 informs the customer 12 with a message, such as "Waiting for response from trader." The "Buy" button 36 is disabled, because the customer 12 cannot execute the deal until the dealer 14 accepts the indicated rate or provides a deal rate. The "Re-request" button 40 and "Cancel" button 38 are enabled to allow the customer 12 to re-request a rate or delete the transaction. If the response of the trader 14 is not received within a certain time period, the request for quote times out, and the customer GUI 2 informs the customer 12 with a message, such as "Sorry, no response from trader."

In the request for quote aspect of an embodiment of the present invention, a category trader 14 can respond to the request for quote by accepting the rate quoted by the WRS 4, by quoting a dealer's rate or by rejecting the transaction. The trader's request for quote response is sent by the WTS 6 to the customer GUI 2. If the category trader 14 rejects the request for quote, the customer GUI 2 validates that the details displayed on the screen are the same as the request for quote. If so, the customer GUI 2 displays a message, such as "RFQ has been refused," and the "Re-request" button 40 and "Cancel" button 38 are enabled to allow the customer 12 to re-request a rate or delete the transaction. If the category trader 14 accepts the request for quote, the customer GUI 2 validates that the trader's response to a request for quote relates to the transaction details displayed on the screen. If so, the customer GUI 2 then displays the dealer's rate and awaits the customer's response. The customer 12 can reject the deal rate by pressing the "Cancel" button 38, in which case the transaction is deleted from the transaction database of the WTS 6. The customer 12 can accept the dealer's rate by pressing the "Buy" button 36, and the transaction is then executed.

FIG. 4 shows a sample message box 44 for the request for quote aspect of an embodiment of the present invention. When a request for quote trigger occurs, the WTS 6 sends a notification message to the MAI 10. The MAI 10 then sends a message to the on-line category traders alerting them of a request for quote. The category traders are able to see these system generated messages in the request for quote message box 44 or when they read their mail. However, if none of the category traders are logged on, then the MAI 10 sends the request for quote messages to all traders belonging to the default trader category. The default category traders are able to see the request for quote messages in the request for quote message box 44 or when they next read their mail.

In the request for quote aspect of an embodiment of the present invention, every time a request for quote is triggered, if a trader in the same category is logged on, then the trader 14 is notified by a message in the status bar on the screen of the trader GUI 4 advising of an incoming message with time, text, and system name, such as "Incoming message: 10:47:52*815725 request for quote RATES". If none of the category traders are logged on, then those default trader category members logged on receive the message. The trader 14 is able to select a message from the request for quote message box 44 and double click to provide a dealer's rate for the warrants transaction that is awaiting a rate quotation. The current transaction details then appear in the screen. Once the dealer 14 accepts or rejects the transaction, a mail message is added in the request for quote message box 44 notifying the category traders of the change in request for quote status. In addition, the trader GUI 4 displays the message in the status bar to alert the category traders of an incoming message with time, text, and system name, such as "Incoming message: 10:47:52*815725 request for quote accepted RATES" or "Incoming message: 10:47:52*815725 request for quote rejected RATES." If none of the category traders are logged on, then those default trader category members logged on receive the message.

FIG. 5 shows a sample trade details screen 46 for the request for quote aspect of an embodiment of the present invention. When a request for quote is selected, the trader GUI 4 gets the transaction details from the WTS 6. The transaction may not exist because the customer 12 may have decided not to wait for a trader's response and cancelled the deal. If this is the case, the trader GUI 4 displays a message, such as "Sorry, request for rates has been cancelled." Otherwise, the transaction details are displayed on the trade details screen 46 including the reason for the request for quote. The trader 14 can accept any rate quoted by the WRS 8, enter a dealer's rate, or reject the transaction. If the dealer 14 presses the "Accept" button 48 on the trade details screen 46, the request for quote status In the transaction database of the WTS 6 is updated accordingly. Similarly, the request for quote status is updated if the dealer 14 presses the "Reject" button 50 on the trade details screen 46. The result is transmitted from the trader GUI 14 to the WTS 6, and the result is sent on to the customer 12 at the customer GUI 2. The WTS 6 also broadcasts the updated request for quote status, via the MAI 10, to all of the on-line category traders. If the trader 14 rejects the request for quote, the customer GUI 2 displays a refusal message and enables the "Re-request" button 40 and "Cancel" button 38 on the deal entry screen 30. If the trader 14 accepts the request for quote, the customer GUI 2 displays the dealer's rate. The customer 12 can reject the deal rate by pressing the "Cancel" button 38 or accept the deal rate by pressing the "Buy" button 36, and the transaction is executed.

Figure 6:
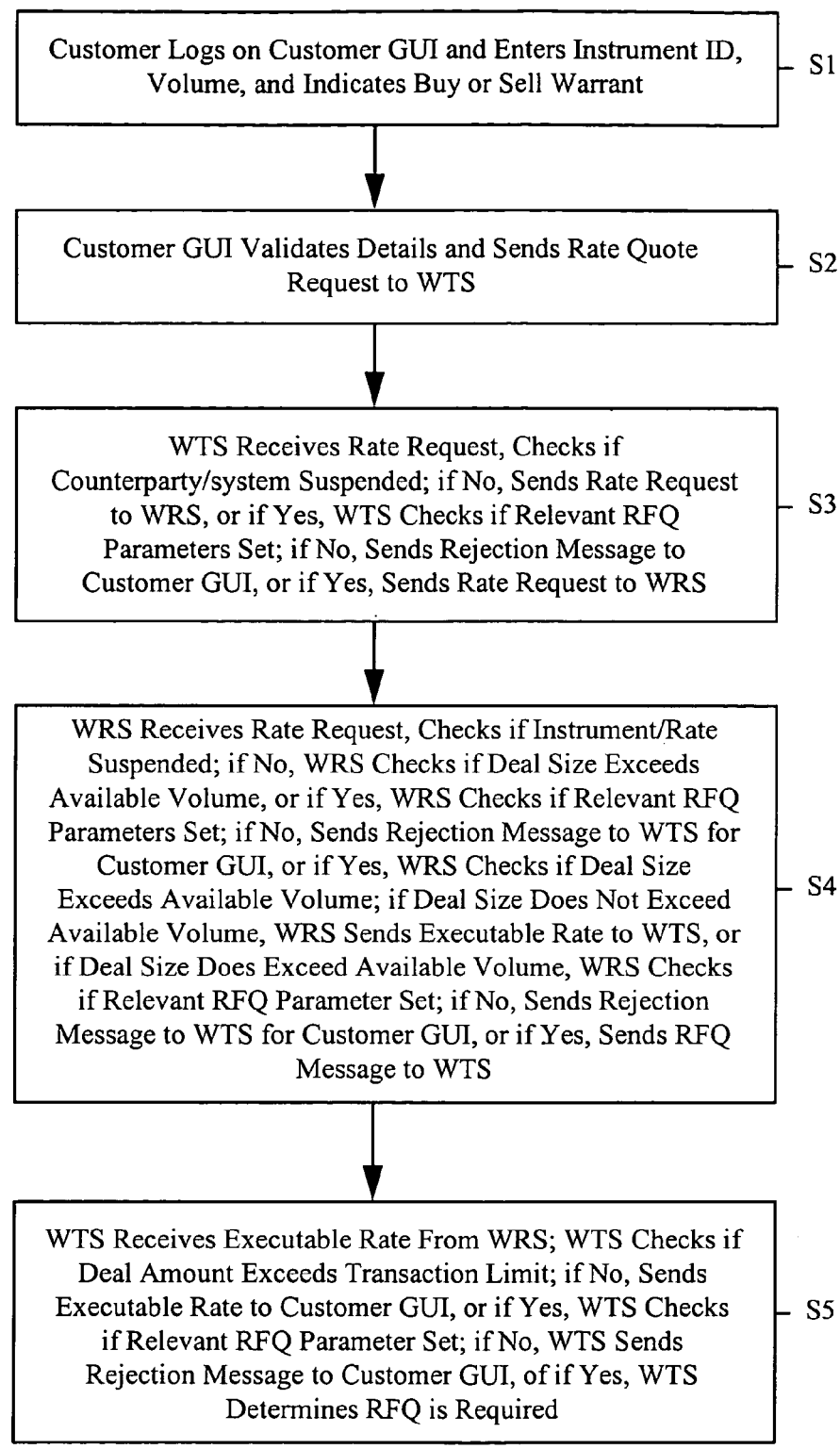
FIG. 6 is a flow chart which illustrates an example of the process of the customer requesting a rate in the request of quote aspect of an embodiment of the present invention.

FIG. 6 is a flow chart which illustrates an example of the process of the customer 12 requesting a rate in the request for quote aspect of an embodiment of the present invention. At S1, the customer 12 logs on the customer GUI 2 and enters an instrument identification 32, a volume 34, and indicates whether to buy or sell 36. At S2, the customer GUI 2 validates the details and sends the rate request to the WTS 6. At S3, the WTS 6 receives the rate request and checks if the counterparty or system is suspended. If not, the WTS 6 sends the rate request to the WRS 8. If the counterparty or system is suspended, the WTS 6 checks if the relevant RFQ parameters 26, 28 are set. If not, the WTS 6 sends a rejection message to the customer GUI 2. If the relevant RFQ parameters 26, 28 are set, the WTS 6 sends the rate request to the WRS 8.

Referring further to FIG. 6, at S4, the WRS 8 receives the rate request and checks if the instrument or rate is suspended. If not, the WRS 8 checks if the deal size exceeds available volume. If the instrument or rate is suspended, the WRS 8 checks if the relevant RFQ parameters 24, 22 set. If not, the WRS 8 sends a rejection message to the WTS 6 for the customer GUI 2. If the relevant RFQ parameters 24, 22 are set, the WRS 8 checks if the deal size exceeds available volume. If the deal size does not exceed available volume, the WRS 8 sends an executable rate to the WTS 6. If the deal size exceeds available volume, the WRS 8 checks if the relevant RFQ parameter 20 is set. If not, the WRS 8 sends a rejection message to the WTS 6 for the customer GUI 2. If the relevant RFQ parameter 20 is set, the WRS 8 sends an RFQ message to the WTS 6. At S5, the WTS 6 receives the executable rate from the WRS 8 and checks if the deal amount exceeds the transaction limit. If not, the WTS 6 sends the executable rate to the customer GUI 2. If the deal amount exceeds the transaction limit, the WTS 6 checks if the relevant RFQ parameter 18 is set. If not, the WTS 6 sends a rejection message to the customer GUI 2. If the relevant RFQ parameter 18 is set, the WTS determines that a request for quote is required.

Figure 7:
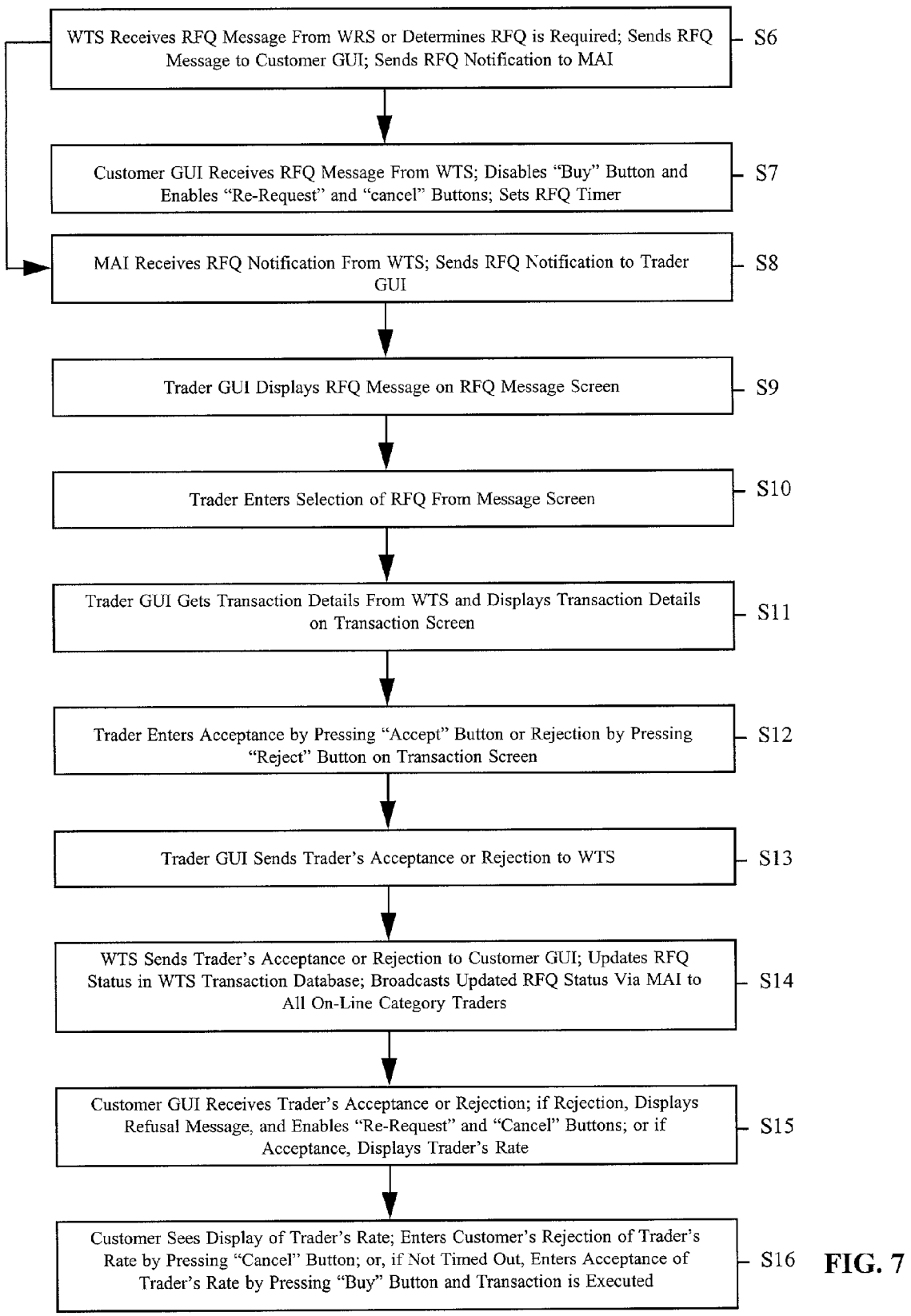
FIG. 7 is a flow chart which illustrates an example of the request for quote notification process for the request for quote aspect of an embodiment of the present invention.

FIG. 7 is a flow chart which illustrates an example of the request for quote notification process for the request for quote aspect of an embodiment of the present invention. At S6, the WTS 6 receives a request for quote message from the WRS 8 or determines that a request for quote is required and sends a RFQ message to the customer GUI 2 and a RFQ notification to the MAI 6. At S7, the customer GUI 2 receives the RFQ message from the WTS 6, disables the "Buy" button 36, enables the "Re-request" button 40 and "Cancel" button 38, and sets a RFQ timer. At S8, the MAI 10 receives the RFQ notification from the WTS 6 and sends the RFQ notification to the trader GUI 4. At S9, the trader GUI 4 displays a RFQ message on the request for quote message screen 44. At S10, the trader 14 enters a selection of the request for quote message from the message screen 44. At S11, the trader GUI 4 gets the transaction details from the WTS 6 and displays the details on the transaction details screen 46.

Referring further to FIG. 7, at S12, the trader 14 enters an acceptance by pressing the "Accept" button 48 or a rejection by pressing the "Reject" button 50 on the transaction details screen 46. At S13, the trader GUI 4 sends the trader's acceptance or rejection to the WTS 6. At S14, the WTS 6 sends the trader's acceptance or rejection to the customer GUI 2, updates the request for quote status in the WTS transaction database, and broadcasts the updated status via the MAI 10 to all on-line category traders. At S15, the customer GUI 2 receives the trader's acceptance or rejection. If a rejection, the customer GUI 2 displays a refusal message for the customer 12. If an acceptance, the customer GUI 2 displays the trader's rate for the customer 12. At S16, the customer 12 sees the display of the trader's rate and enters the customer's rejection by pressing the "Cancel" button 38 on the deal entry screen 30. Alternatively, if the customer 12 wants to accept the trader's rate and if the request for quote has not timed out, the customer 12 enters the customer's acceptance of the trader's rate by pressing the "Buy" button 36, and the transaction is executed.

Figure 8:
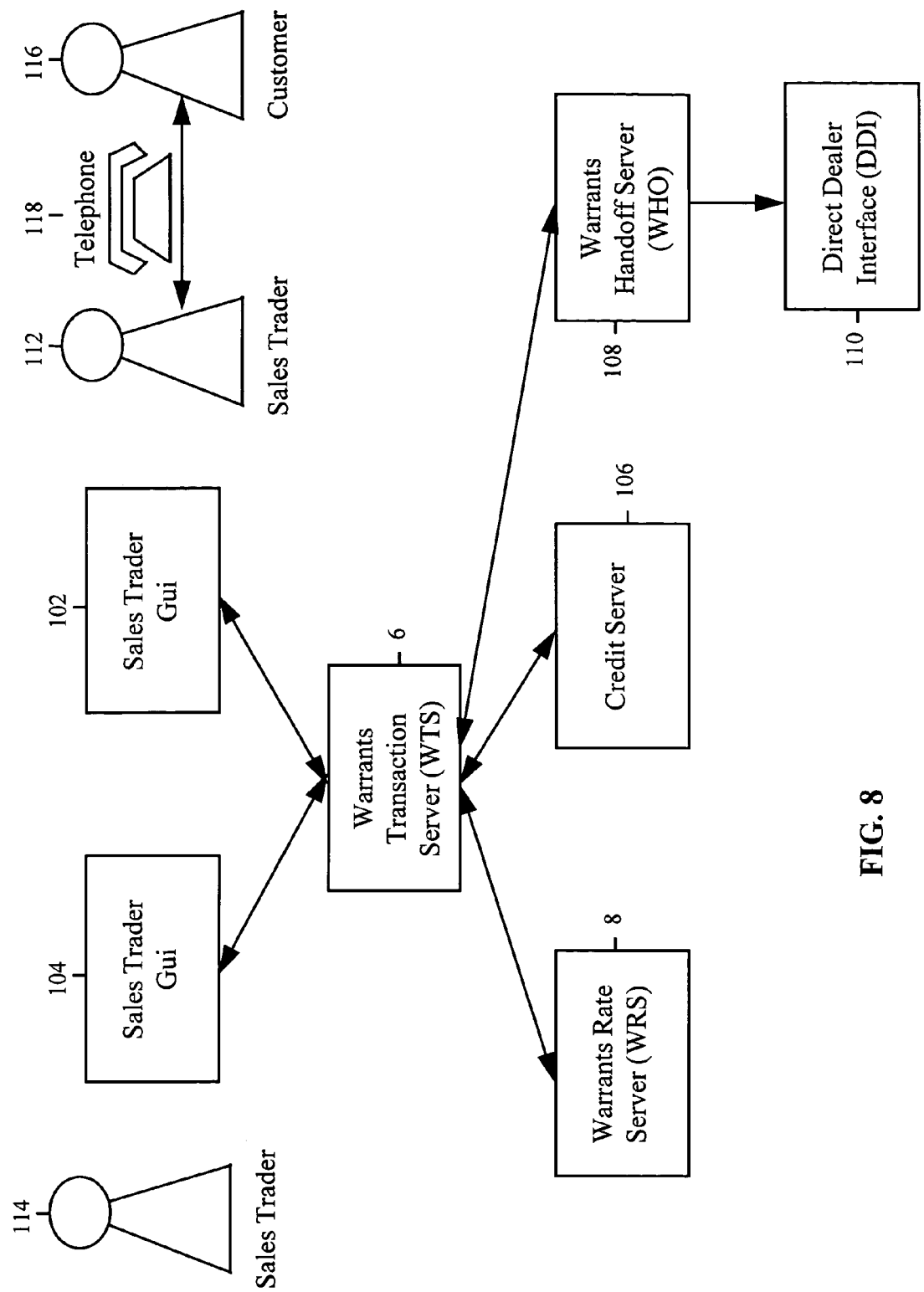
FIG. 8 is a schematic diagram which illustrates an overview example of key components and the flow of information between the key components in a sales trader aspect of an embodiment of the present invention.

Another aspect for an embodiment of the present invention is a sales trader feature, which provides an automated system and method for warrant trading that allows a special type of trader, referred to as a sales trader, to deal on behalf of a selected customer within the CATS-OS system. FIG. 8 is a schematic diagram which illustrates an overview example of key components and the flow of information between the key components in the sales trader aspect for an embodiment of the present invention. The sales trader aspect for an embodiment of the present invention makes use, for example, of one or more sales trader GUIs 102, 104, the warrants transaction server (WTS) 6, the warrants rate server (WRS) 8, as well as a credit server (CRS) 106, a warrants hand-off server (WHO) 108 and a direct dealer interface (DDI) 110. In the sales trader aspect, any number of sales traders 112, 114 perform this function without necessarily knowing the price of particular warrants and without setting their own prices. Typically, but not necessarily, one or more of these traders 112, 114 are located at terminals of the CATS-OS system, such as sales trader GUIs 102, 104, near the trading room itself. The sales traders 112, 114 receive calls from customers, such as customer 116, on the telephone 118 or other communication device in order to conduct trades for the customers.

An advantage of the sales trader aspect for an embodiment of the present invention is that all the facilities of the CATS-OS system are available and fully met for the customers, including accurately set price, correctly collected information, and other requirements for deals to proceed, such as credit lines in place. In addition the sales trader aspect provides the advantage of reduced error rates achieved by the CATS-OS system without the disadvantage of having to install all the CATS-OS system requirements for customers who do not wish installation but who wish to continue to deal over the telephone 118. The sales trader aspect thus provides full warrant trading capabilities without the expense of highly paid professional traders or inter-bank traders. The sales trader aspect also includes specialized features relating to trading by phone 118 and customer account access. In the sales trader aspect, the sales traders 112, 114 have privileged access to user accounts. In this embodiment, the sales traders 112, 114 do not have access to all capabilities that normal users of the CATS-OS system have, but the system does provide the sales traders 112. 114 with the capability to select the customers, such as customer 116, on whose behalf they are acting and to perform certain necessary functions to complete warrant trading.

In the sales trader aspect of an embodiment of the present invention, when the sales traders 112, 114 log in, input of name and password information allows the sales traders 112, 114 to deal on behalf of a number of users in a secure manner. The sales trader aspect permits a user to trade in the CATS-OS system on behalf of its customers and makes use, for example, of the GUI and the servers in the existing CATS-OS system to increase the number of warrants transactions done through the CATS-OS system. The sales trader aspect enables this by including warrants transactions done with customers, such as customer 116, over the telephone 118. This new type of user is able to enter transactions in the CATS-OS system on behalf of customers.

As the existing CATS-OS system provides an automatic deal hand-off to the DDI 110, a benefit of the sales trader aspect for an embodiment of the present invention includes, for example, a significant reduction in the wrong rates being quoted or entered accidentally into the system by traders. Currently, many telephone trades are mismatched and have to be adjusted by a middle office. Another benefit of the sales trader aspect for an embodiment of the present invention is to avoid manual work and hand-written tickets, thus saving time for the trader. An additional benefit of the sales trader aspect is that the CATS-OS system GUI software application need not be installed at the customer's site, because the sales traders, such as sales traders 112, 114, are able to enter and view transactions on behalf of customers.

Figure 9:
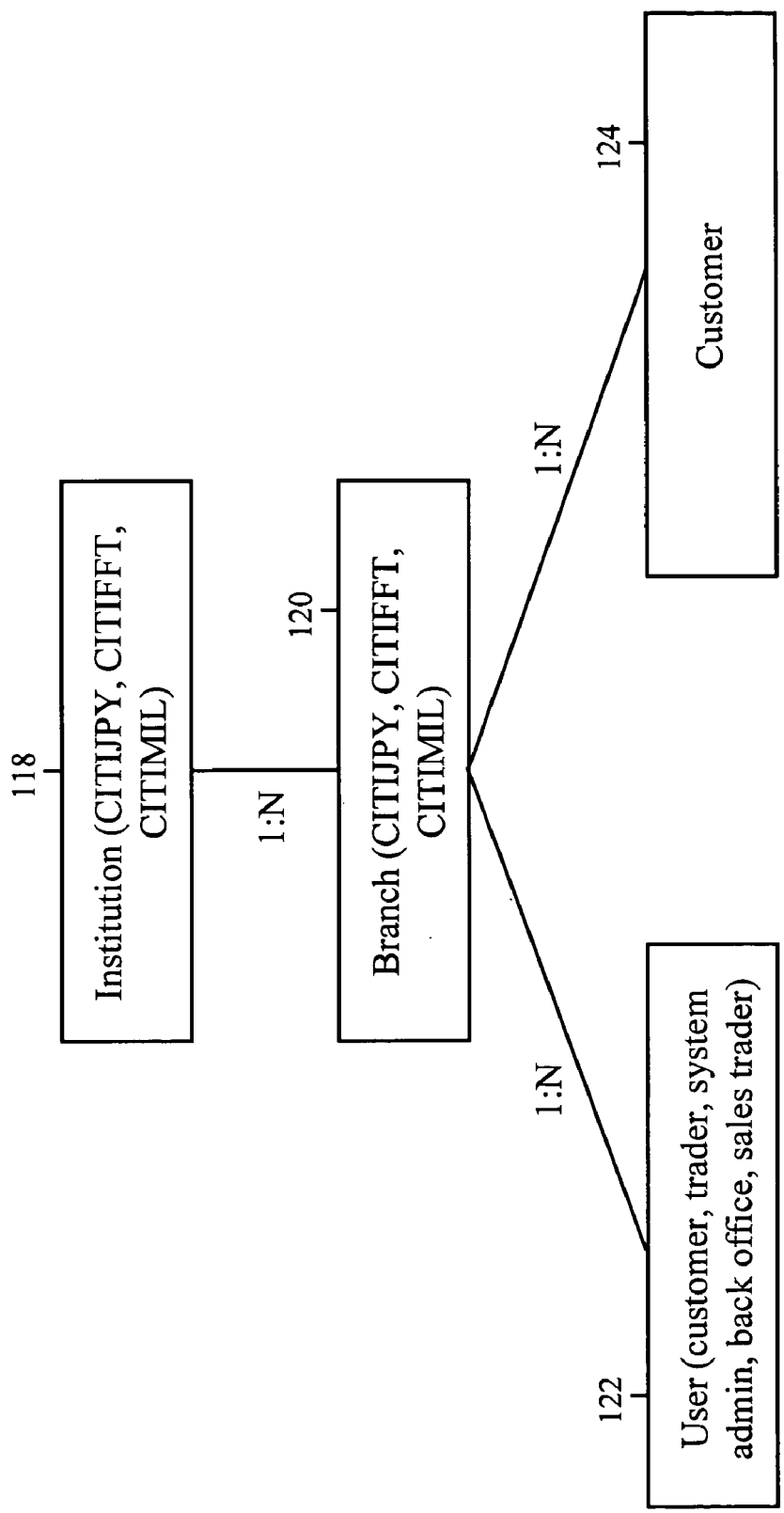
FIG. 9 is a schematic diagram which illustrates an example overview of databases for the sales trader aspect of an embodiment of the present invention.

FIG. 9 is a schematic diagram which illustrates an example overview of databases for the sales trader aspect of an embodiment of the present invention. The sales trader aspect includes, for example, an "Institution" table 118, a "Branch" table 120, a "User" table 122, and a "Customer" table 124. In the sales trader aspect, the non-CATS-OS system bank counterparty details are manually entered into the "Branch" table 120 of the CATS-OS system. In addition, the trading relationships and credit limits are manually maintained from relationship and credit limit maintenance screens. The existing customers' GUI trading mechanism is not changed. The DDI 110 stores additional fields, such as customer identification and retail customer's settlements instructions, in a DDI interface table and Exchange Feed table of the existing CATS-OS system. A customer list is uploaded from a text file into the CATS-OS system database. Thereafter, the "Customer" table 124 of the CATS-OS system is manually maintained by a system administrator. The sales traders, such as sales traders 112, 114, do not have the privilege to negotiate prices or override maximum transaction amount being deleted. This privilege is available to traders who are able to respond to pending transactions that await request for quotes.

The sales trader aspect for an embodiment of the present invention utilizes a number of servers. The WTS 6 coordinates the activities of the CATS-OS system. The WTS 6 contains a database which stores user profiles, transactions and relationships. The WRS 8 receives input from price feeds, such as Reuters price feeds, and updates an in-memory table with the latest rates. The WRS 8 stores and updates volumes and warrants instrument details. The CRS 106 maintains the credit for each branch. The credit is drawn down each time a transaction is executed. The WHO 108 receives the completed transactions and hands them off to the deal capture and position-keeping system or DDI 110.

In the sales trader aspect for an embodiment of the present invention, the customer 116 is an individual who has an account at a host retail bank branch, such as a global consumer bank. Alternatively, the customer 116 is a fund manager or broker of a corporate entity or bank that uses the CATS-OS system to execute warrants transactions against a branch of the host bank. The customer 116 is set up in the "User" table 122 with the user type "Customer" and a user ID as a unique identifier. The traders, such as trader 112, are the corporate warrants dealers at a branch of the host bank. A trader, such as trader 112, is responsible for making the prices, setting trading limits and covering positions resulting from transactions in local currency. The trader, such as trader 1112, is set up in the "User" table 122 with user type "Trader" with a unique identifier or user ID. A counterparty is the corporate entity, bank, or financial institution that uses the CATS-OS system to execute warrants transactions against a branch of the host bank. The counterparty is set up in the "Branch" table 120 with a unique identifier or branch ID.

In the sales trader aspect for an embodiment of the present invention, a sales trader, such as trader 112, is a new type of user of the CATS-OS system. For example, the sales trader 112 is either a host bank employee or a host bank broker who deals over the telephone 118, for example, with a host bank counterparty. The sales trader 112 is able to enter and view transactions on behalf of a customer 116 of the CATS-OS system. The customer 116 is also able to log into the CATS-OS system itself. The customer 116 can then be manually added as a CATS-OS system user from a user profile maintain screen. An organization is classed as an "Institution" in the CATS-OS system. An institution is stored in the "Institution" table 118 with a unique identifier or institution ID. For example, a company called "The Acme Company" is set up with an institution ID of "ACMEINST." A branch is an instance of a bank branch or a corporate branch held in the "Branch" table 120 with a branch ID. The Acme Company with branches in London, Frankfurt and Tokyo has branches, for example, "LONACME", "FFTACME", and "TOKACME" set up in the CATS-OS system.

Figure 10:
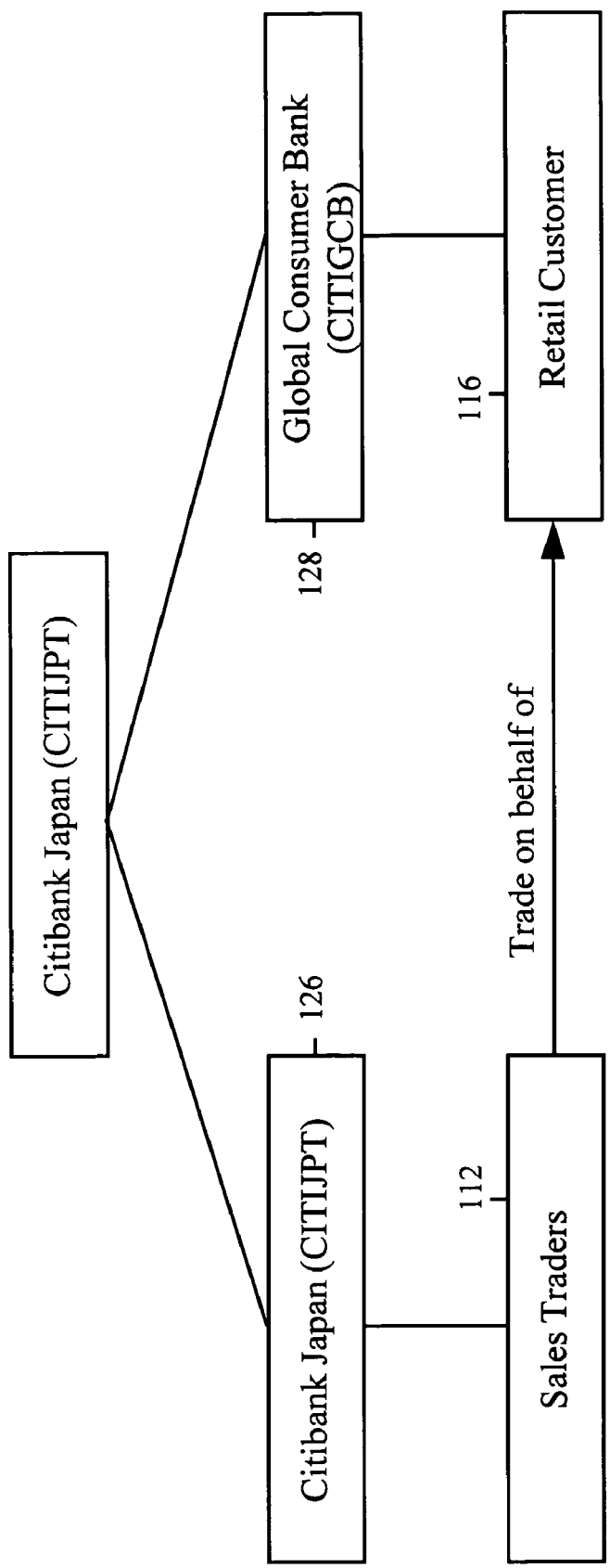
FIG. 10 is a schematic diagram which amplifies and provides further detail regarding the sample database overview shown in FIG. 9.
Figure 11:
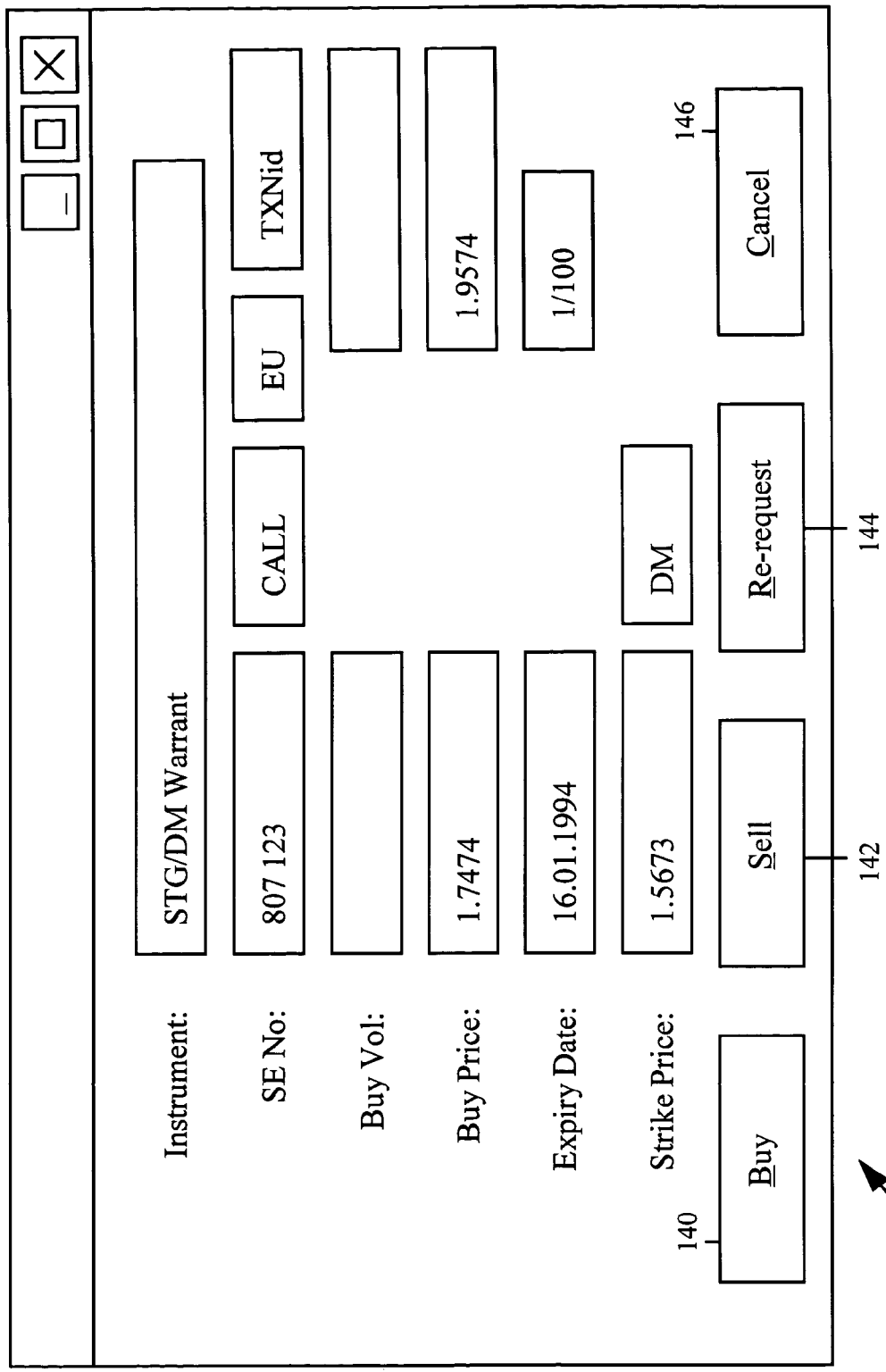
FIG. 11 shows a sample deal entry screen for the sales trader aspect of an embodiment of the present invention.
Figure 12:
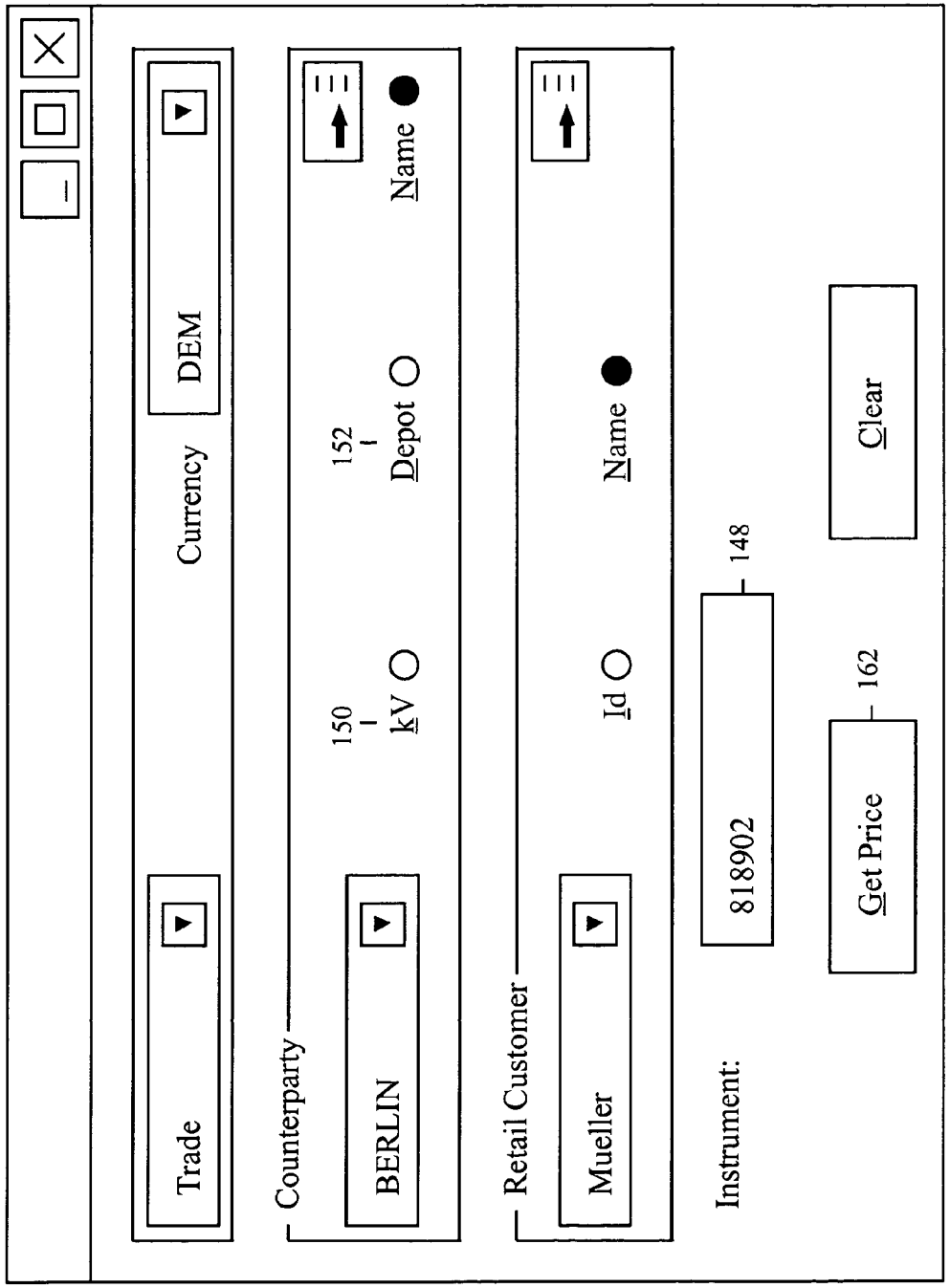
FIG. 12 shows a sample transaction screen for the sales trader aspect of an embodiment of the present invention.
Figure 14:
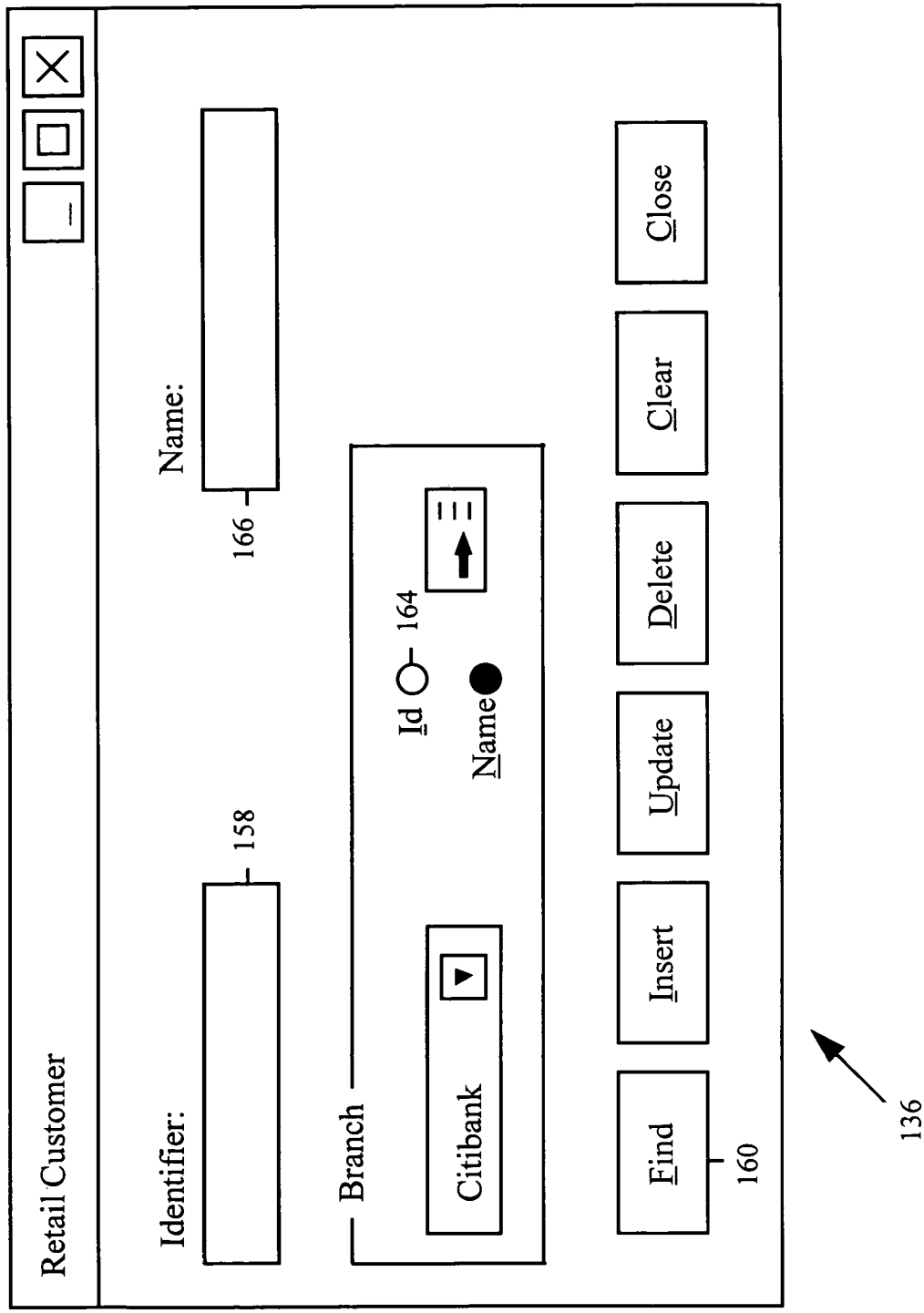
FIG. 14 shows a sample customer maintenance screen for the sales trader aspect of an embodiment of the present invention.

In the sales trader aspect for an embodiment of the present invention, a relationship describes the trading relationship which the trading branch has with all other host bank counterparties. As long as a trading relationship exists between the two relevant branches, a sales trader of the trading branch, such as sales trader 112, can trade on behalf of any of the counterparties or the counterparty's retail customers, if any. Hence, a sales trader is not restricted to trade on behalf of a subset of counterparty customers. FIG. 10 is a schematic diagram which amplifies and provides further detail regarding the sample database overview shown in FIG. 9 for the sales trader aspect of an embodiment of the present invention. In accordance with the existing CATS-OS system trading mechanism, all warrants transactions are done bank to bank. For example, a sales trader, such as sales trader 112, of the host bank in Japan trading on behalf of a retail customer or a global consumer bank, such as customer 116, results in the deal being done, for example, between "CITIJPY" and "CITIGCB."

In the sales trader aspect for an embodiment of the present invention, a sales trader transaction has its own time-out period for which the warrant's price is valid. This time-out period is maintained in the "Branch" table 120 against the branch of the sales trader 112. The time-out period is longer, for example, than the normal price time-out period. This is because there is some time delay between the buy/sell price being quoted to the customer 116 over the phone 118, and the customer 116 stating the transaction volume and whether the customer 116 wishes to buy or sell. It is possible that the price of the warrant is updated in the meantime. The transaction is still executed with the buy/sell price quoted, as long as the sales trader time-out period does not expire.

FIGS. 11, 12, 13, 14, and 15 illustrate a sample deal entry screen 130, a sample transaction screen 132, branch maintenance screen 134, a sample customer maintenance screen 136, and a sample trade details screen 138, respectively, for the sales trader aspect of an embodiment of the present invention. The GUI 102 and the WTS 6 assure that the sales trader transaction is executed within the new time-out period. If not, the GUI 102 displays a time-out message and disables the "Buy" button 140 and "Sell" button 142 from the deal entry screen 130. The sales trader 112 can then re-request a price quotation by pressing a the "Re-request" button 144 or cancel the transaction by pressing the "Cancel" button 146 on the deal entry screen 130. When the sales trader 112 enters the warrants transaction in the CATS-OS system, the sales trader 112 enters it as a broker of the trading branch. In other words, if the customer 116 says "I wish to buy X warrants", the sales trader 112 enters "sell" by pressing the "Sell" button 142 on the deal entry screen 130 Similarly, if the customer 116 says "I wish to sell X warrants", the sales trader 112 enters "buy" by pressing the "Buy" button 140 on the deal entry screen 130.

In the sales trader aspect of an embodiment of the present invention, when the customer 116 telephones the sales trader 112 and requests to make warrants transaction, the sales trader 112 at the sales trader GUI 102 logs into the CATS-OS system. The transaction screen 132 is displayed automatically to the user 112. The transaction screen 132 is more detailed than the one normally shown to the CATS-OS system customers. The sales trader 112 enters the warrants stock exchange number (SE No.) 148. The sales trader 112 then enters a kV number 150 or depot number 152, if known. The kV number is given to banks or financial institutions that trade on the German stock exchange. Those with a kV number settle their account through the German clearing system. Those with a depot number are non-German banks or financial institutions that settle directly. The GUI 102 defaults to entry of kV number 150. The kV number 150 or depot number 152 identifies domestic or non-domestic bank approved counterparties.

Alternatively, in the sales trader aspect for an embodiment of the present invention, the sales trader 112 can enter the counterparty branch name 154. The sales trader 112 can request a list of branch names starting with x characters (maximum of eight characters). If the sales trader 112 enters a search string and presses a "Find" button 156 on the branch maintenance screen 134, the GUI 102 ensures that some search criteria has been entered. The WTS 6 checks the "Branch" table 120 to see if the first few characters of the branch names match the search criteria. If matching branch names are found, the WTS 6 returns the total number of matching branch ID's and names. If there are more than 100 matching branch ID's, the WTS 6 does not return any of the branch details and a message, such as "XXX matching branch names were found, please re-enter search criteria" is displayed. If none are found, a message is displayed, such as "None found; please re-enter search criteria."

In the sales trader aspect for an embodiment of the present invention, for trading on behalf of retail bank customers, the sales trader 112 enters the customer ID 158, if known. Otherwise, the sales trader 112 can request customer names starting with x characters (maximum of eight characters). If the sales trader 112 enters a search string and presses the "Find" button 160 on the customer maintenance screen 136, the GUI 102 ensures that some search criteria has been entered. The WTS 6 checks the "Customer" table 124 to see if the first few characters of the customer names match the search criteria. If matching customer names are found, the WTS 6 returns the total number of matching customer ID's and names. If there are more than 100 matching customer ID's, the WTS 6 does not return any of the customer details and a message, such as "XXX matching customer names were found, please re-enter search criteria" is displayed. If none are found, a message is displayed, such as "None found; please re-enter search criteria."

In the sales trader aspect of an embodiment of the present invention, the sales trader 112 does not know the volume the customer 116 wishes to buy or sell. Once the CATS-OS system quotes a buy and sell price, the customer 116 decides the volume and whether to buy/sell. The sales trader 112 can request a price quotation by pressing a "Get Price" button 162 on the transaction screen 132. The GUI 102 ensures that a kV or a depot number has been entered. Otherwise, a message is displayed, such as "Please enter a kV/depot no or counterparty name," and the sales trader 112 is prompted for re-input. The WTS 6 then validates the kV or depot number entered. If the counterparty specified does not exist, then the system administrator must manually enter this branch, its trading relationship with a trading branch, and credit limits in the CATS-OS system, and a message will be displayed, such as "Invalid branch". If a customer ID is entered, the WTS 6 validates that it exists in the "Customer" table 124. If not, a message will be displayed, such as "Invalid customer". The system administrator must manually enter the customer details in the customer maintenance screen 136. On successful validation, the WRS 8 generates a two-way price quote, which is both the buy and sell price for sales trader transactions. Before executing the transaction, the sales trader 112 must enter the volume. If not, the GUI 102 prompts the sales trader 112 for re-entry of the volume field. Once the customer 116 accepts the rate quoted within the new time-out period, the sales trader 112 executes the transaction by pressing either the "Buy" button 140 or the "Sell" button 142 on the deal entry screen 130.

In the sales trader aspect for an embodiment of the present invention, if the CATS-OS system is unable to quote a price and the relevant request for quote (RFQ) parameters are switched on, the WTS 6 and/or the WRS 8 triggers a RFQ to the relevant category traders that are logged in. The GUI displays a message indicating the reason for a RFQ. The sales trader 112 then waits for a trader to respond to the RFQ and quote a price. Otherwise, the sales trader 112 can re-request a price or cancel the transaction. The WTS 6 and the WRS 8 check to determine whether the deal amount exceeds the maximum transaction limit and whether the deal amount exceeds the available volume. If so, and the relevant RFQ parameters are switched on, a RFQ is triggered. The GUI displays a message indicating the reason for the RFQ.

The sales trader 112 then waits for a trader to respond to the RFQ and quote a price. Otherwise, the sales trader 112 can re-request a price or cancel the transaction. When the sales trader 112 executes or cancels a transaction, the sales trader's branch credit limit is updated accordingly.

In the sales trader aspect of an embodiment of the present invention, the sales trader 112 sees the customer maintenance screen 136. In a customer reference field, the sales trader 112 enters the counterparty's employee name. The customer reference field can be used to view transactions and reports. On successful execution, the WTS 6 updates the volume on the transaction table. The transaction is then automatically handed to the DDI 110. For example, for every Japanese sales trader warrants transactions handed off to the DDI 110, the WHO 108 sends additional fields to the DDI 110. These are the customer ID 164, such as the retail customer bank account number, and the retail customer name 166. The customer ID 164 and name 166 fields are valid for transactions with retail bank customers; otherwise, it is blank. The retail customer's settlements instructions, i.e., customer ID 164 and name 166, are deemed a mandatory field, for example, for Japanese back office settlements operations. The WTS 6 hands off the customer ID and name for every transaction to the WHO 108. The WHO 108 only hands off, for example, the additional two fields for Japanese transactions.

In the sales trader aspect of an embodiment of the present invention, for those banks or financial institutions that do not settle, for example, through a German clearing house, the warrants transaction amounts are settled directly between the trading bank or financial institution and the counterparty bank or financial institution. This is done using a depot number, such as the branch plus a base plus an account number. German banks or financial institutions that go through the clearing house settle, for example, by using the German stock exchange number or kV number in the DDI 110. For warrants transactions with retail bank customers, their accounts are settled, for example, by a back office settlements system.

In an embodiment of the present invention, for sales trader transactions, deal tickets show a sales trader user ID and counterparty customer ID. An "Entered by" field in the deal ticket is the sales trader's user ID. The WTS 6 generates deal tickets with additional fields, such as the customer's ID and customer's name. These are only valid for sales trader transactions executed on behalf of retail bank customers. Otherwise they are blank. For sales trader transactions, transaction reports show the sales trader's user ID and counterparty's customer ID. The "Entered by" field 168 in the transaction report is the sales trader's user ID. The WTS 6 generates transaction reports with additional fields, such as the customer's Id and retail customer's settlements instructions. These are only valid for sales trader transactions executed on behalf of retail bank customers. Otherwise they are blank.

In the sales trader aspect of an embodiment of the present invention, for sales trader transactions, two way price quotation is necessary. When the sales trader 112 enters a transaction and the CATS-OS system is unable to quote prices, an RFQ is triggered if the RFQ parameters are switched on. In other words, category traders are expected to respond to an RFQ and quote a two way price. An RFQ may be triggered if the rate, instrument, counterparty, or system is suspended, or if the deal amount is greater than the maximum transaction limit or the deal amount is greater than available volume. The volume and buy/sell field may be blank for sales trader transactions. The GUI and the WTS 6 ensure that the trader responds within the new time-out period for sales trader transactions.

Figure 16:
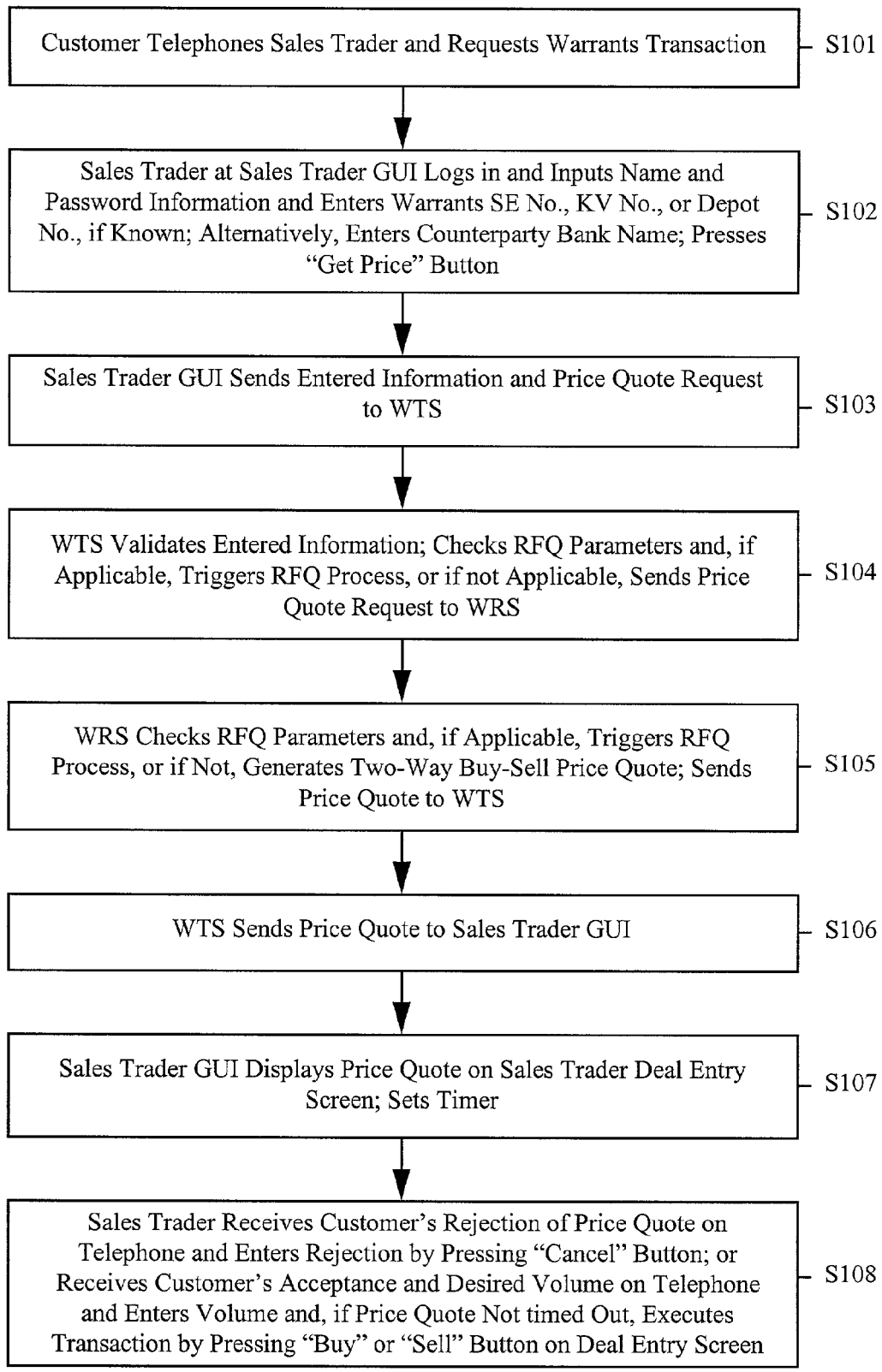
FIG. 16 is a flow chart which illustrates an example of the sales trader transaction process for the sales trader aspect of an embodiment of the present invention.

FIG. 16 is a flow chart which illustrates a sample sales trader transaction for the sales trader aspect of an embodiment of the present invention. At S101, the customer 116 at a telephone 118 contacts the sales trader 112 and requests a warrants transaction. At S102, the sales trader 112 at the sales trader GUI 102 logs in and inputs the sales trader's name and password information, enters the customer's warrants transaction information, and presses the "Get Price" button 162 for a price quote request. At S103, the sales trader GUI 104 sends the price quote request to the WTS 6. At S104, the WTS 6 validates the entered information, checks RFQ parameters, and if applicable, triggers the RFQ process; or if not applicable, sends the price quote request to the WRS 8.

Referring further to FIG. 16, at S105, the WRS 8 checks RFQ parameters, and if applicable, triggers the RFQ process; or if not, generates a two-way buy-sell price quote and sends it to the WTS 6. At S106, the WTS 6 sends the price quote to the sales trader GUI 112. At S112, the sales trader GUI 102 displays the price quote for the sales trader. At S114, the sales trader 112 communicates the price quote to the customer 116. At S107, the customer 116 responds to the sales trader 112 with the customer's decision to reject or accept the price quote, and if accepted by the customer 116, the customer's desired volume. At S108, the sales trader 112 enters the customer's rejection by pressing the "Cancel" button 146, or if accepted by the customer 116, enters the customer's desired volume and executes the transaction by pressing the "Buy" button 140 or "Sell" button 142.

An additional aspect for an embodiment of the present invention is a multi-bank feature, which provides a system and method for automated warrant trading that allows a plurality of banks to deliver their prices using the CATS-OS system. The multi-bank aspect enables the single bank CATS-OS system to perform in a multi-bank mode by establishing links to one or more additional banks. Trading data is collected from the other banks, and once a deal is done, the deal is returned to a particular bank so that it can then manage the position which it has and perform its own assessment and the like. The multi-bank aspect for an embodiment of the present invention converts the single bank automated warrant trading CATS-OS system to a multi-bank automated warrant trading system and method.

Figure 17:
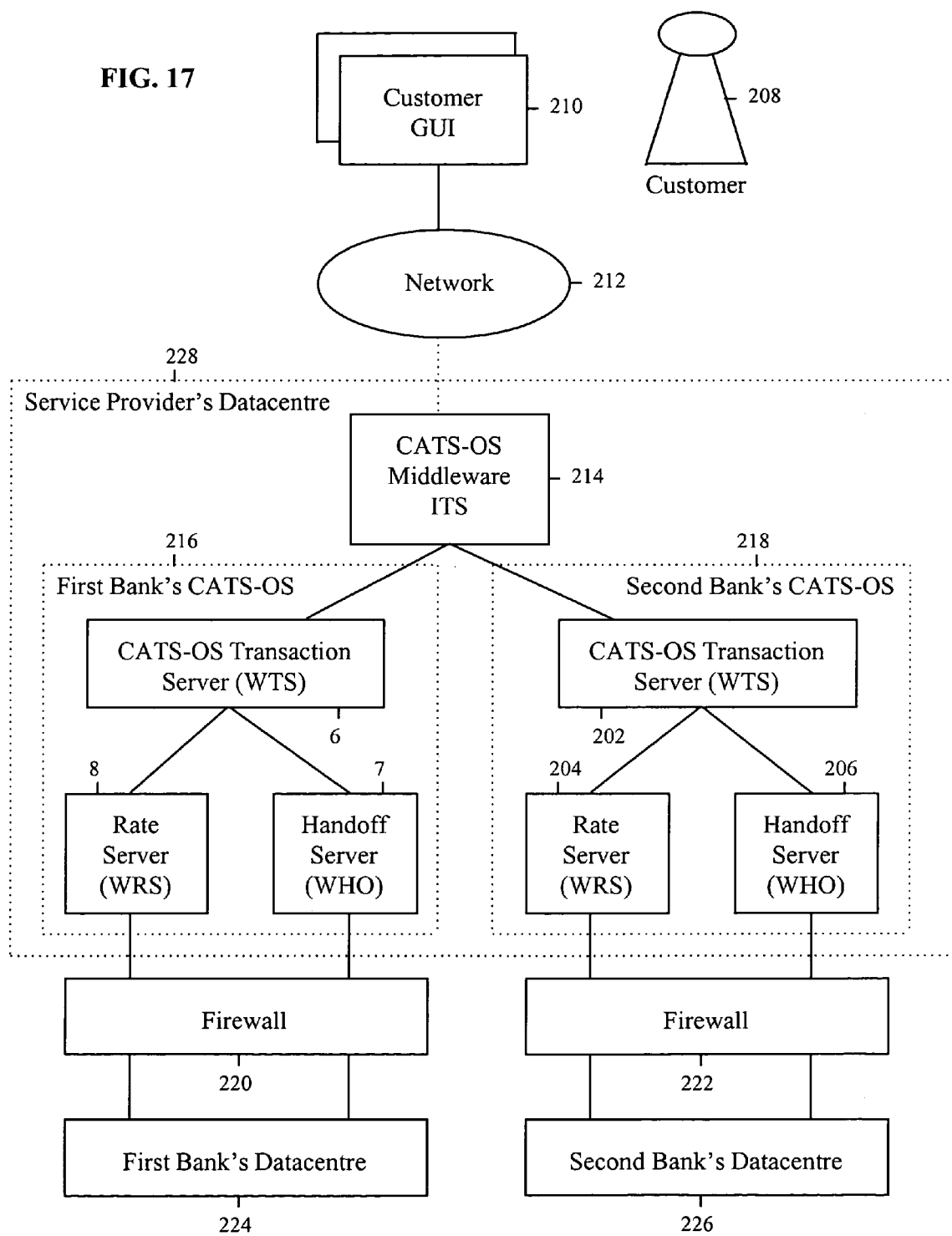
FIG. 17 is a schematic diagram which illustrates an overview example of key components and the flow of information between the key components for a multi-bank aspect of an embodiment of the present invention.

FIG. 17 is a schematic diagram which illustrates an example overview example of key components and the flow of information between the key components for the multi-bank aspect of an embodiment of the present invention. The multi-bank aspect avoids the potential problem of being overly embedded. For example, if a bank offers competing prices, there are potential regulatory problems, such as a claim that the bank is conducting a stock exchange. In other words, when a bank allows many different competing prices on one system, the system may be claimed to be in effect a stock exchange. The multi-bank aspect for an embodiment of the present invention avoids the claim that it is a stock exchange, because the system does not have direct price competition between different banks using the multi-bank aspect of the system.

The single bank CATS-OS system is an end tier client-server system, an advantage of which is that the different functions are very well partitioned. The functions of the single bank system include the rate server or WRS, which receives and fulfills rate requests from the transaction server or WTS, and a hand-off server or WHO, which hands off complete transactions to a direct dealer interface or DDI. The WRS receives rights from the bank and manages and presents them to the rest of the system as required, and the WHO receives bills from the system and hands them off to the bank and provides a reconciliation process. The single bank CATS-OS system also includes the WTS and layers of security and messaging which tie the whole system together.

In the multi-bank aspect of an embodiment of the present invention, in addition to a first bank's WTS 6, for example, one or more additional transaction servers, such as a second bank's WTS 202, are employed, which are completely independent from the first bank's WTS 6 and completely independent from one another. Each additional transaction server, such as the second bank's WTS 202, deals exclusively with an additional bank, such as the second bank, in the multi-bank aspect for an embodiment of the present invention. Likewise, one or more additional rate servers, such as the second bank's WRS 204, and one or more additional hand-off servers, such as the second bank's WHO 206, are provided, which enables segregation between the multiple banks. A customer 208 uses a graphical user interface (GUI) 210 coupled via a network 212 to shared communications and messaging layers 214 to the separate automated warrant trading systems of a plurality of banks, such as trading systems 216 and 218.

In the multi-bank aspect for an embodiment of the present invention, the separate automated warrant trading systems 216 and 218 of each bank includes, for example, the separate transaction servers WTS 6 and WTS 212 coupled to the shared communications and messaging layers 214, and the separate rate servers WRS 8 and WRS 204 and hand-off servers WHO 7 and WHO 216 coupled to the respective transaction servers WTS 6 and WTS 202. Further, each bank's separate trading system 216, 218 includes a firewall 220, 222, established between the respective banks' rate servers WRS 8 and WRS 204 and hand-off servers WHO 7 and WHO 216, and the respective banks' data centers 224, 226. Thus, one bank on the multi-bank system is not allowed to see how another bank on the system deals with the particular customer 208. While the multi-bank aspect utilizes shared communications and messaging layers 214, it runs independently on each end user's system. The multi-bank aspect is transparent to each of the banks using the system. As far as a particular bank using the multi-bank system is concerned, it is the only bank on the system.

Currently, the CATS-OS system runs very successfully as an automated electronic trading tool for a bank's customers, for example, in Germany. These customers are primarily brokers, so the bank is often not aware of the identity of the end customer. The multi-bank aspect for an embodiment of the present invention allows other banks to add their prices to the CATS-OS system, so these brokers can buy and sell their warrants as well. This has an advantage for the brokers in that they only have to deal with one system to in order to meet their customers' needs. The multi-bank aspect for an embodiment of the present invention enables an entity, such as a wholly owned subsidiary of a bank, to provide a system which deals with hundreds of other banks, corporations and/or fund managers by demonstrating the ability of the subsidiary to maintain a separation between the bank and itself, as well as all other parties. Such an entity can be responsible for both the software and hardware for the CATS-OS system and can run the system in its own data center 228 and provide a clearly defined hand-off between its parent bank and itself.

The multi-bank aspect of an embodiment of the present invention enables the CATS-OS system user 208 to easily buy and sell warrants from a number of banks and market makers. If the user 208 accesses the system through dial-up, the user 208 does not to have to disconnect and re-dial to deal with another bank. The user 208 does not to have to log in separately, for example, to each of the systems 216, 218. Further, the systems 216, 218 are not so integrated as to raise fears that a stock exchange is created. Additionally, segregation between price makers is maintained. The multi-bank aspect for an embodiment of the present invention provides a fast, secure and reliable method of extracting rates from the price maker and returning to the bank any resultant deals in a timely and reliable fashion.

In the multi-bank aspect for an embodiment of the present invention, an extra level of functionality can be added to the current user front-end GUI to allow the extra banks to be visible. Alternatively, for a relatively small number of banks, the GUI can be run a number of times, once for each available bank. In the alternative approach, the user 208 simply clicks from one system to the other as needed. A mechanism is also provide to enable this with the keyboard only. This can be accomplished, for example, with changes to the GUI and a higher specification machine to run more than one program at once. In the multi-bank aspect for an embodiment of the present invention, users of both the first bank's system 216 and the second bank's system 218 only have access to the systems via their GUIs, and segregation of all functions are maintained. An entity such as a subsidiary of the first bank can act in the mode of system administrator. A decision can be made as to which customers are enabled for which banks. The system can still be used as a single bank system as needed. Predetermined business arrangements are entered, for example, between the first bank, its subsidiary and the other banks, such as the second bank.

Figure 18:
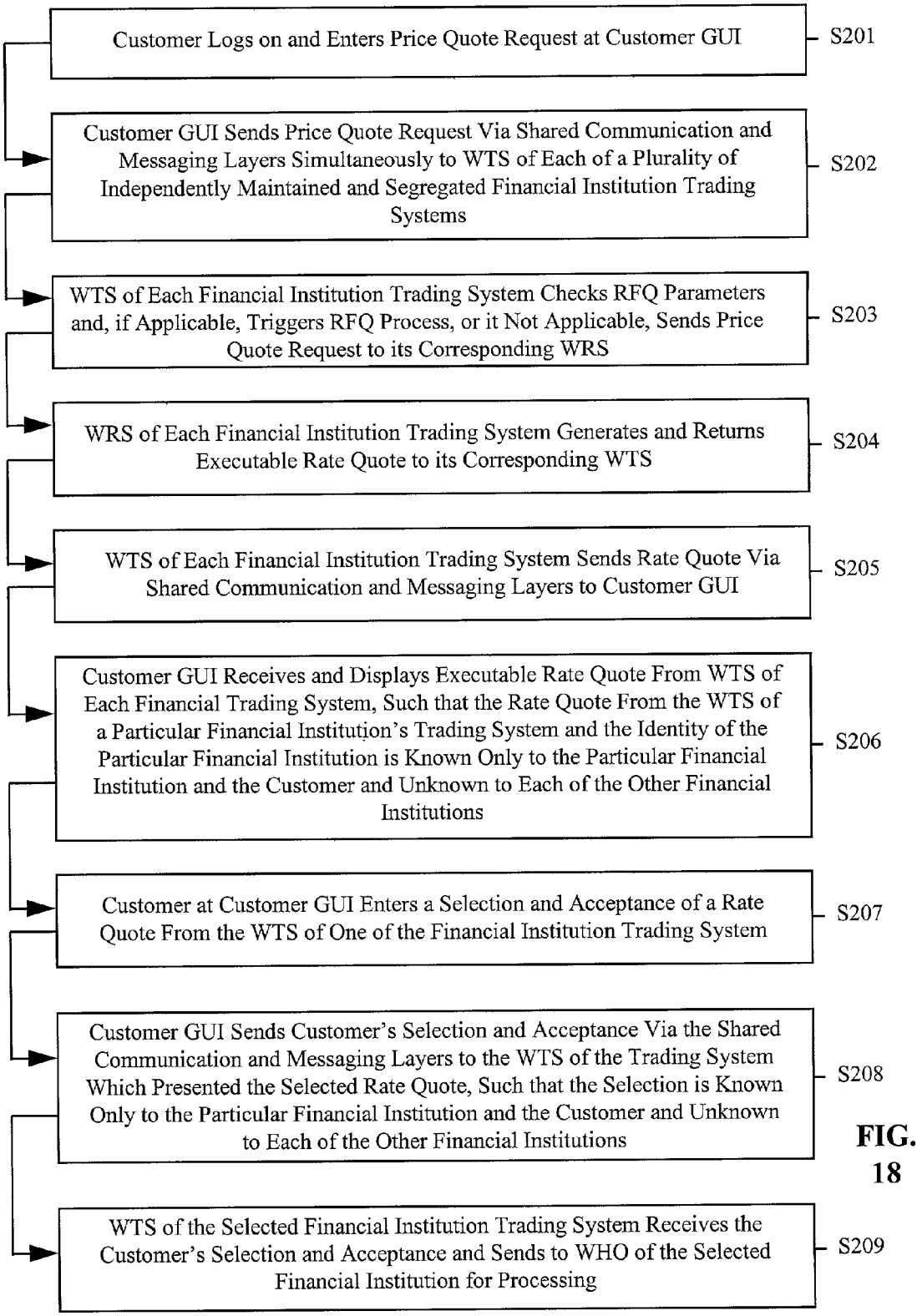
FIG. 18 is a flow chart which illustrates an example of the process of a customer transaction in the multi-bank aspect of an embodiment of the present invention.

FIG. 18 is a flow chart which illustrates an example of the process of a customer transaction in the multi-bank aspect for an embodiment of the present invention. At S201, the customer 208 at the customer GUI 210 logs on and enters the customer's price quote request. At S202, the customer GUI 210 sends the price quote request via shared communication and messaging layers 214 simultaneously to the WTS 6 and the WTS 202 of the separately maintained and segregated trading systems 216 and 218. At S203, the WTS 6 and the WTS 202 each sends the price quote request to the corresponding WRS 8 and WRS 204 of its own trading system 216 or 218. At S204, each of the WRS 8 and WRS 204 independently generates an executable rate and sends the rate to the corresponding WTS 6 and WTS 202 of its own trading system 218 or 218. At S205, each of the WTS 6 and the WTS 202 sends its own trading system's rate quote via the shared communication and messaging layers 214 to the customer GUI 210.

Referring further to FIG. 18, at S206, the customer GUI 210 receives and displays each of the rate quotes, such that the rate quote and the identity of the financial institution's trading system 216 or 218 which furnished the rate quote are known only to the customer 208 and the financial institution which furnished the rate quote. At S207, the customer 208 at the customer GUI 210 enters the customer's selection of one of the rate quote furnished by one of the trading systems 216 or 218. At S208, the customer GUI 210 sends the customer's acceptance via the shared communication and messaging layers 214 to the WTS 6 or the WTS 202 of the trading system 216 or 218 which furnished the selected rate quote, such that the selection is known only to the customer 208 and the financial institution whose trading system 216 or 218 furnished the selected rate quote. At S209, the WTS 6 or the WTS 202 of the trading system 216 or 218 which furnished the selected rate quote receives the customer's acceptance and sends the acceptance to corresponding WHO 7 or 206 of the trading system 216 or 218 which furnished the selected rate quote for processing.

Although the invention has been described with reference to these preferred embodiments, other embodiments can achieve the same results. Variations and modifications of the present invention will be apparent to one skilled in the art, and the above disclosure is intended to cover all such modifications and equivalents. Accordingly, the invention is only limited by the following claims.

What is claimed is:

1. A method for data management of a financial transaction, comprising:

receiving a request for a user for a proposed financial transaction via a terminal by each of a plurality of independently maintained and segregated trading systems coupled over a network to the terminal;

generating a rate quote via at least one of the independently maintained and segregated trading systems consisting of one of an executable rate quote and a category trader's manual rate quote for the proposed financial transaction, wherein the executable rate quote is generated if a first predefined condition for allowing the proposed financial transaction on the basis of the executable rate quote is identified from a group of conditions consisting at least in part of a proposed transaction volume not exceeding an available volume and a proposed transaction amount not exceeding a predefined limit, and the category trader's manual rate quote is generated if a second predefined condition for rejecting the proposed financial transaction on the basis of the executable rate quote is identified from a group of conditions consisting at least in part of a proposed transaction volume in excess of an available volume and a proposed transaction amount in excess of a predefined limit and at least in part of a predetermined setting of a request for quote parameter;

automatically prompting the user for a selection of the generated rate quote for the proposed financial transaction via said at least one of the independently maintained and segregated trading systems;

automatically holding the generated rate quote for a predetermined period of time for the user by said at least one of the independently maintained and segregated trading systems;

receiving a request for execution of the proposed transaction for the user in accordance with the selection by the user of the generated rate quote by said at least one of the independently maintained and segregated trading systems over the network via the terminal; and automatically executing the proposed transaction for the user in accordance with the generated rate quote upon receipt of the request for execution within the predetermined period of time by said at least one of the independently maintained and segregated trading systems.

2. The method of claim 1, wherein receiving the request via the terminal further comprises entering the request at the terminal by the user.

3. The method of claim 1, wherein receiving the request via the terminal further comprises entering the request at the terminal for the user by a sales trader.

4. The method of claim 3, wherein entering the request via the terminal by the sales trader further comprises receiving the request by the sales trader from the user.

5. The method of claim 1, wherein receiving the request via the terminal further comprises receiving the request by a transaction server of each of the plurality of independently maintained and segregated trading systems coupled over the network to the terminal.

6. The method of claim 5, wherein receiving the request at the terminal further comprises receiving the request by a rate server coupled to the transaction server of each of the plurality of independently maintained and segregated trading systems.

7. The method of claim 1, wherein generating the rate quote further comprises automatically identifying the first predefined condition for generating the executable rate quote for the proposed transaction by at least one of the transaction server and the rate server of said at least one of the independently maintained and segregated trading systems.

8. The method of claim 7, wherein automatically identifying the first predefined condition for generating the executable rate quote further comprises automatically generating the executable rate quote by the rate server of said at least one of the independently maintained and segregated trading systems.

9. The method of claim 8, wherein automatically generating the executable rate quote by the rate server further comprises automatically generating the executable rate quote by the rate server coupled to the transaction server of said at least one of the independently maintained and segregated trading systems.

10. The method of claim 1, wherein generating the rate quote further comprises automatically identifying the second predefined condition for generating the category trader's manual rate quote.

11. The method of claim 1, wherein automatically identifying the predefined condition for rejecting the request for the proposed financial transaction on the basis of the executable quote further comprises automatically identifying the predefined cause for rejecting the proposed financial transaction by at least one of the transaction server and the rate server of said at least one of the independently maintained and segregated trading systems.

12. The method of claim 1, wherein automatically identifying the predefined condition for rejecting the proposed financial transaction on the basis of the executable quote further comprises automatically identifying at least one condition for rejecting the proposed financial transaction selected from a group of conditions for rejecting the proposed financial transaction consisting of a proposed transaction counterparty suspension, a proposed transaction system suspension, a proposed transaction instrument suspension, a proposed transaction rate suspension, a proposed transaction volume exceeding an available volume, and a proposed transaction amount exceeding a predefined limit.

13. The method of claim 1, wherein automatically generating the request for the category trader's manual rate quote further comprises automatically confirming the predetermined setting of the request for quote parameter corresponding to the at least one identified predefined condition for rejection of the proposed financial transaction.

14. The method of claim 13, wherein automatically confirming the request for quote parameter setting further comprises automatically confirming the request for quote parameter setting by at least one of the transaction server and the rate server of said at least one of the independently maintained and segregated trading systems.

15. The method of claim 10, wherein automatically identifying the second predefined condition for generating the category trader's manual rate quote further comprises automatically prompting entry of the category trader's manual rate quote by at least one of a plurality of category traders.

16. The method of claim 15, wherein automatically prompting the entry of the category trader's manual rate quote further comprises receiving an input of the category trader's manual rate quote by at least one of the plurality of category traders.

17. The method of claim 1, wherein automatically prompting the user for selection of the generated rate quote further comprises automatically displaying the generated rate quote for the user.

18. The method of claim 17, wherein automatically displaying the generated rate quote further comprises automatically displaying the generated rate quote for the user at the terminal.

19. The method of claim 18, wherein automatically displaying the generated rate quote further comprises automatically displaying the generated rate quote at a user terminal for the user.

20. The method of claim 18, wherein automatically displaying the generated rate quote automatically displaying the generated rate quote at a sales trader terminal for the user.

21. The method of claim 1, wherein automatically holding the generated rate quote for the predetermined period of time for the user further comprises automatically setting a counter for the predetermined period of time.

22. The method of claim 1, wherein receiving the request for execution at the terminal further comprises entering the request at a user terminal by the user.

23. The method of claim 22, wherein receiving the request for execution at the terminal further comprises entering the request at a sales trader terminal by a sales trader for the user.

24. The method of claim 23, wherein entering the request for execution at the sales trader terminal by the sales trader further comprises receiving the request by the sales trader from the user.

25. The method of claim 1, wherein receiving the request for execution at the terminal further comprises receiving the request for execution by the transaction server of said at least one of the independently maintained and segregated trading systems over the network via the terminal.

26. The method of claim 1, wherein automatically executing the proposed transaction for the user further comprises automatically handing off the request for execution to a hand-off server of said at least one of the independently maintained and segregated trading systems.

27. The method of claim 26, wherein automatically handing off the request for execution further comprises automatically handing off the request for execution by the transaction server of said at least one of the independently maintained and segregated trading systems.

28. A system for data management of a financial transaction, comprising:
   a plurality of independently maintained and segregated trading systems coupled over a network to a terminal, each being adapted for receiving a request for a user for a proposed financial transaction via the terminal;
   each of the independently maintained and segregated trading systems being adapted for generating a rate quote consisting of one of an executable rate quote and a category trader's manual rate quote for the proposed financial transaction, wherein the executable rate quote is generated if a first predefined condition for allowing the proposed financial transaction on the basis of the executable rate quote is identified from a group of conditions consisting at least in part of a proposed transaction volume not exceeding an available volume and a proposed transaction amount not exceeding a predefined limit, and the category trader's manual rate quote is generated if a second predefined condition for rejecting the proposed financial transaction on the basis of the executable rate quote is identified from a group of conditions consisting at least in part of a proposed transaction volume in excess of an available volume and a proposed transaction amount in excess of a predefined limit and at least in part of a predetermined setting of a request for quote parameter;

wherein each of the independently maintained and segregated trading systems is further adapted for automatically prompting the user for a selection of the generated rate quote for the proposed financial transaction;

wherein each of the independently maintained and segregated trading systems is also adapted for automatically holding the generated rate quote for a predetermined period of time for the user;

wherein each of the independently maintained and segregated trading systems is additionally adapted for receiving a request for execution of the proposed transaction for the user in accordance with the selection by the user of the generated rate quote over the network via the terminal; and wherein each of the independently maintained and segregated trading systems is adapted in addition for automatically executing the proposed transaction for the user in accordance with the generated rate quote upon receipt of the request for execution within the predefined period of time.

29. The system of claim 28, wherein the terminal further comprises one of a user's terminal and a sales trader's terminal adapted for receiving the request for the proposed financial transaction.

30. The system of claim 29, wherein each of the independently maintained and segregated trading systems further comprises at least one transaction server coupled to the terminal adapted for receiving the request for the proposed financial transaction.

31. The system of claim 30, wherein each of the independently maintained and segregated trading systems further comprises a rate server coupled to the transaction server adapted for receiving the request for the proposed financial transaction.

32. The system of claim 31, wherein at least one of the transaction server and the rate server of each of said independently maintained and segregated trading systems is adapted for identifying the first predefined condition for generating the executable rate quote.

33. The system of claim 32, wherein the the rate server coupled to the transaction server of each of said independently maintained and segregated trading systems is adapted for generating the executable rate quote.

34. The system of claim 31, wherein at least one of the transaction server and the rate server of each of said independently maintained and segregated trading systems is adapted for identifying the second predefined condition for generating the category trader's manual rate quote.

35. The system of claim 34, further comprising at least one category trader's terminal coupled to the transaction server of each of said independently maintained and segregated trading systems is adapted for automatically prompting entry of the category trader's manual rate quote.

36. The system of claim 28, wherein the terminal further comprises one of a user's terminal and a sales trader's terminal.

37. The system of claim 28, further comprising a counter of each of said independently maintained and segregated trading systems adapted for automatically holding the generated rate quote for a predefined period of time.

38. The system of claim 31, further comprising a hand-off server coupled to the transaction server of each of said independently maintained and segregated trading systems adapted for automatically executing the proposed financial transaction.

39. A method of operating a computer system for data management of a financial transaction, comprising:

receiving at a terminal, by each of a plurality of independently maintained and segregated trading systems coupled over a network to the terminal, a request for a user for a proposed financial transaction;

generating a rate quote, via at least one of the independently maintained and segregated trading systems, consisting of one of an executable rate quote and a category trader's manual rate quote for the proposed financial transaction, wherein the executable rate quote is generated if a predefined condition for generating the executable rate quote is identified, wherein the predefined condition for generating the executable rate quote exists if a predefined cause for rejecting the request for the proposed financial transaction is not identified by at least one of a transaction server coupled to the terminal and a rate server coupled to the transaction server, and upon failure to identify the predefined condition for generating the executable rate quote, the category trader's rate quote is generated if a predefined condition for generating the category trader's rate quote is identified, wherein the predefined condition for generating the category trader's rate quote exists if the predefined cause for rejecting the request for the proposed financial transaction is identified and if a predetermined setting of a request for quote parameter corresponding to the identified cause for rejecting the request for the proposed financial transaction is likewise confirmed by at least one of the transaction server and the rate server;

automatically prompting the user at the terminal for a selection of the generated rate quote for the proposed financial transaction via said at least one of the independently maintained and segregated trading systems, wherein the generated rate quote comprises the executable rate quote if the predefined condition for generating the executable rate quote is identified, and wherein upon failure to identify the predefined condition for generating the executable rate quote, the generated rate quote comprises the category trader's rate quote if the predefined condition for generating the category trader's manual rate quote is identified;

automatically holding the generated rate quote for a predetermined period of time for the user by said at least one of the independently maintained and segregated trading systems;

receiving a request by the transaction server via the terminal for execution of the proposed transaction for the user in accordance with the selection by the user of the generated rate quote; and handing off the request for execution of the proposed transaction by the transaction server to a hand-off server for automatically executing the proposed transaction for the user in accordance with the generated rate quote upon receipt of the request for execution within the predetermined period of time.

40. A computer system for data management of a financial transaction, comprising:

a plurality of independently maintained and segregated trading systems coupled over a network to a terminal, each being adapted for receiving a request for a user for a proposed financial transaction via the terminal;

at least one transaction server of each of the independently maintained and segregated trading systems being coupled to the terminal and at least one rate server of each of the independently maintained and segregated trading systems being coupled to the transaction server adapted for generating a rate quote consisting of one of an executable rate quote and a category trader's manual rate quote for the proposed financial transaction, wherein the executable rate quote is generated if a predefined condition is identified, wherein the predefined condition for generating the executable rate quote exists if a predefined cause for rejecting the request for the proposed financial transaction is not identified by at least one of the transaction server and the rate server, and upon failure to identify the predefined condition for generating the executable rate quote, the category trader's rate quote is generated if a predefined condition for generating the category trader's rate quote is identified, wherein the predefined condition for generating the category trader's rate quote exists if the predefined cause for rejecting the request for the proposed financial transaction is identified and if a predetermined setting of a request for quote parameter corresponding to the identified cause for rejecting the request for the proposed financial transaction is likewise confirmed by at least one of the transaction server and the rate server;

each of the independently maintained and segregated trading systems being further adapted for automatically prompting the user via the terminal for a selection of the generated rate quote for the proposed financial transaction, wherein the generated rate quote comprises the executable rate quote if the predefined condition for generating the executable rate quote is identified, and wherein upon failure to identify the predefined condition for generating the executable rate quote, the generated rate quote comprises the category trader's rate quote if the predefined condition for generating the category trader's rate quote is identified;

a system counter for automatically holding the generated rate quote for a predetermined period of time for the user;

the transaction server being adapted for receiving a request via the terminal for execution of the proposed transaction for the user in accordance with the selection by the user of the generated rate quote; and the transaction server being adapted for handing off the request for execution of the proposed transaction to a hand-off server for automatically executing the proposed transaction for the user in accordance with the generated rate quote upon receipt of the request for execution within the predefined period of time.

* * * * *

UNITED STATES PATENT AND TRADEMARK OFFICE
CERTIFICATE OF CORRECTION

| | | |
|---|---|---|
| PATENT NO. | : 7,130,823 B1 | Page 1 of 1 |
| APPLICATION NO. | : 09/454978 | |
| DATED | : October 31, 2006 | |
| INVENTOR(S) | : Peter E. Rayner et al. | |

It is certified that error appears in the above-identified patent and that said Letters Patent is hereby corrected as shown below:

IN TITLE PAGE THE REFERENCES CITED (56) - OTHER PUBLICATIONS -

In Column 2, Line 1 of the Reference under OTHER PUBLICATIONS, please change "Super SOES + Selected Reference, 1997." to -- Super SOES + SelectNet Quick Reference, 1997. --

Signed and Sealed this

Twentieth Day of February, 2007

JON W. DUDAS
*Director of the United States Patent and Trademark Office*